No. 703,154. Patented June 24, 1902.
F. SCHAFER.
MATCH MAKING MACHINE.
(Application filed Feb. 26, 1901.)

(No Model.) 24 Sheets—Sheet 1.

No. 703,154. Patented June 24, 1902.
F. SCHAFER.
MATCH MAKING MACHINE.
(Application filed Feb. 26, 1901.)
(No Model.) 24 Sheets—Sheet 2.

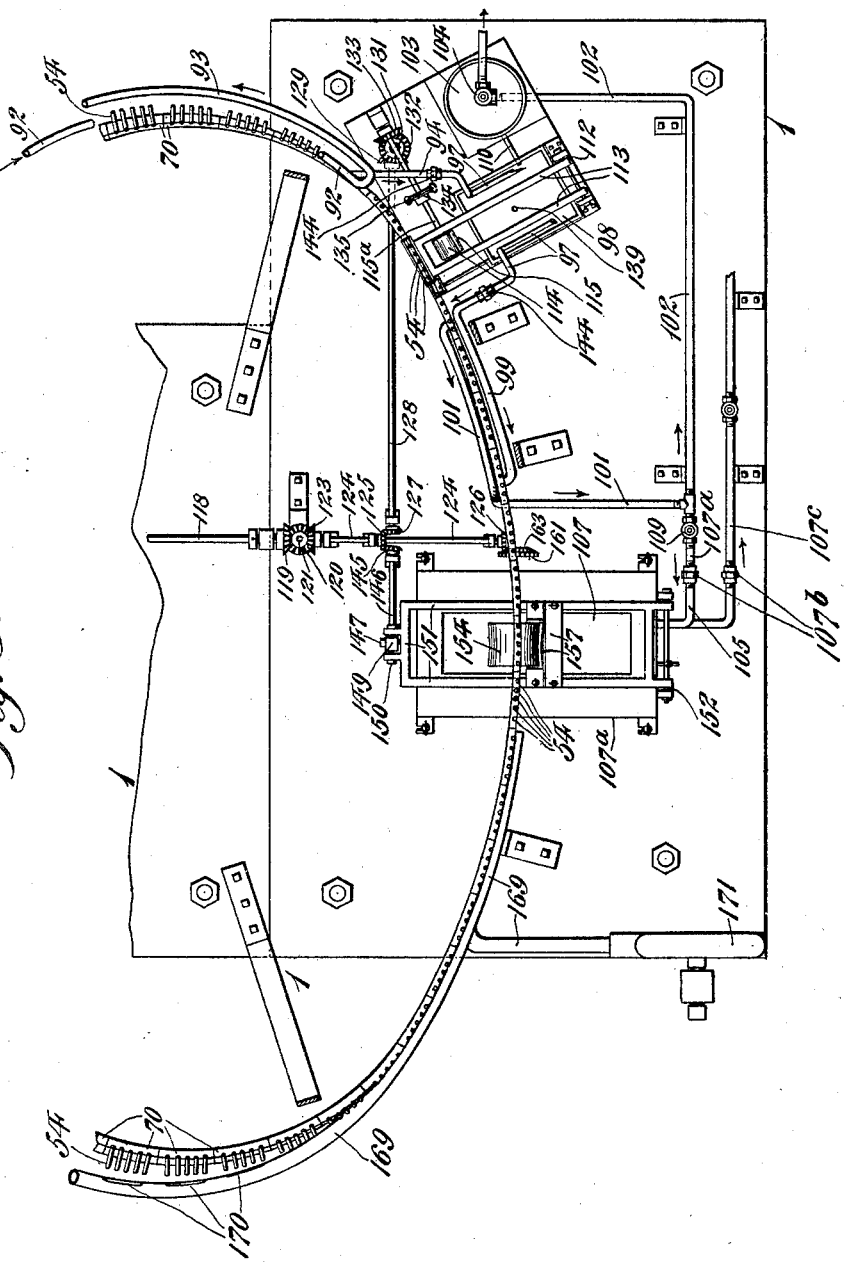

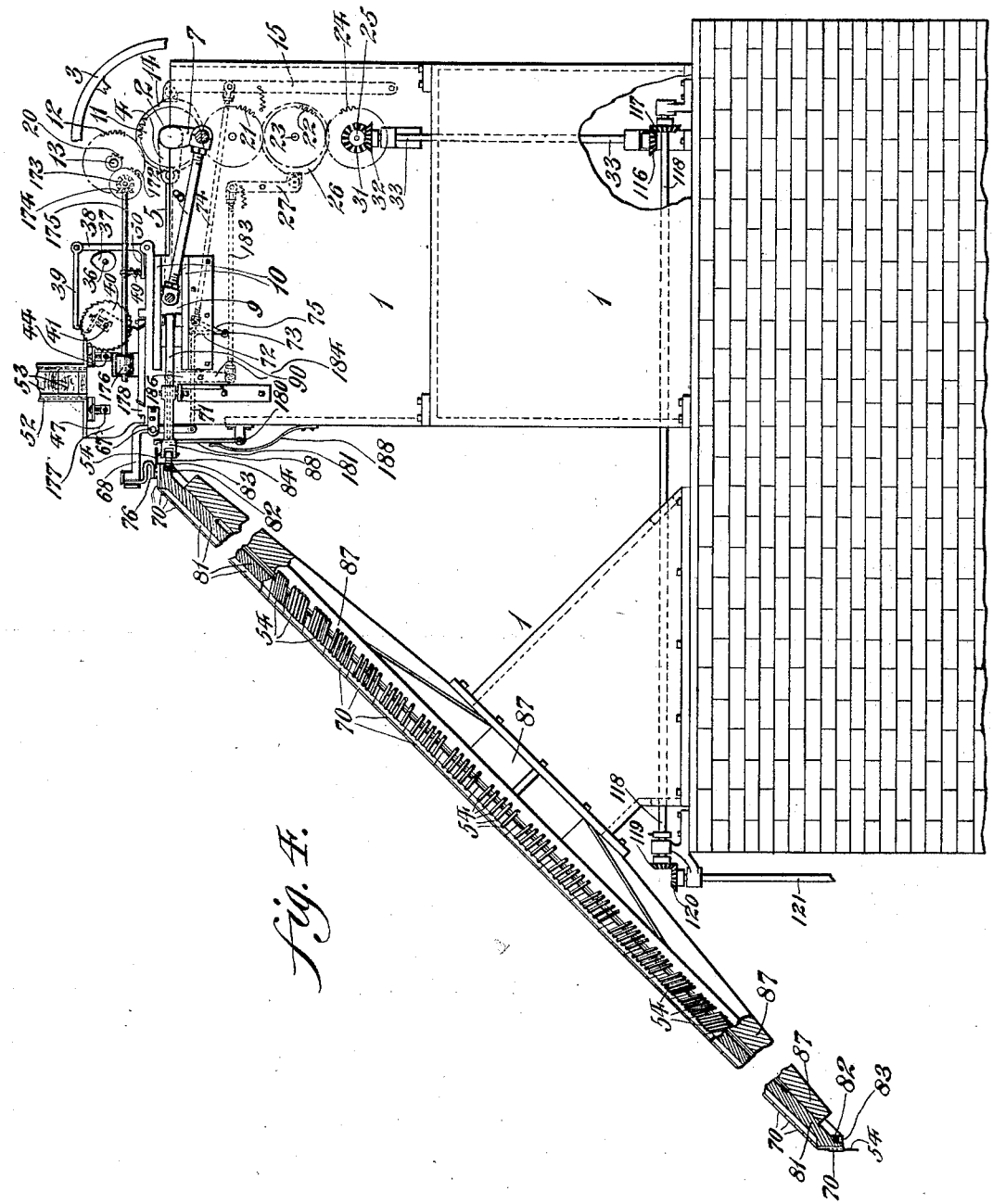

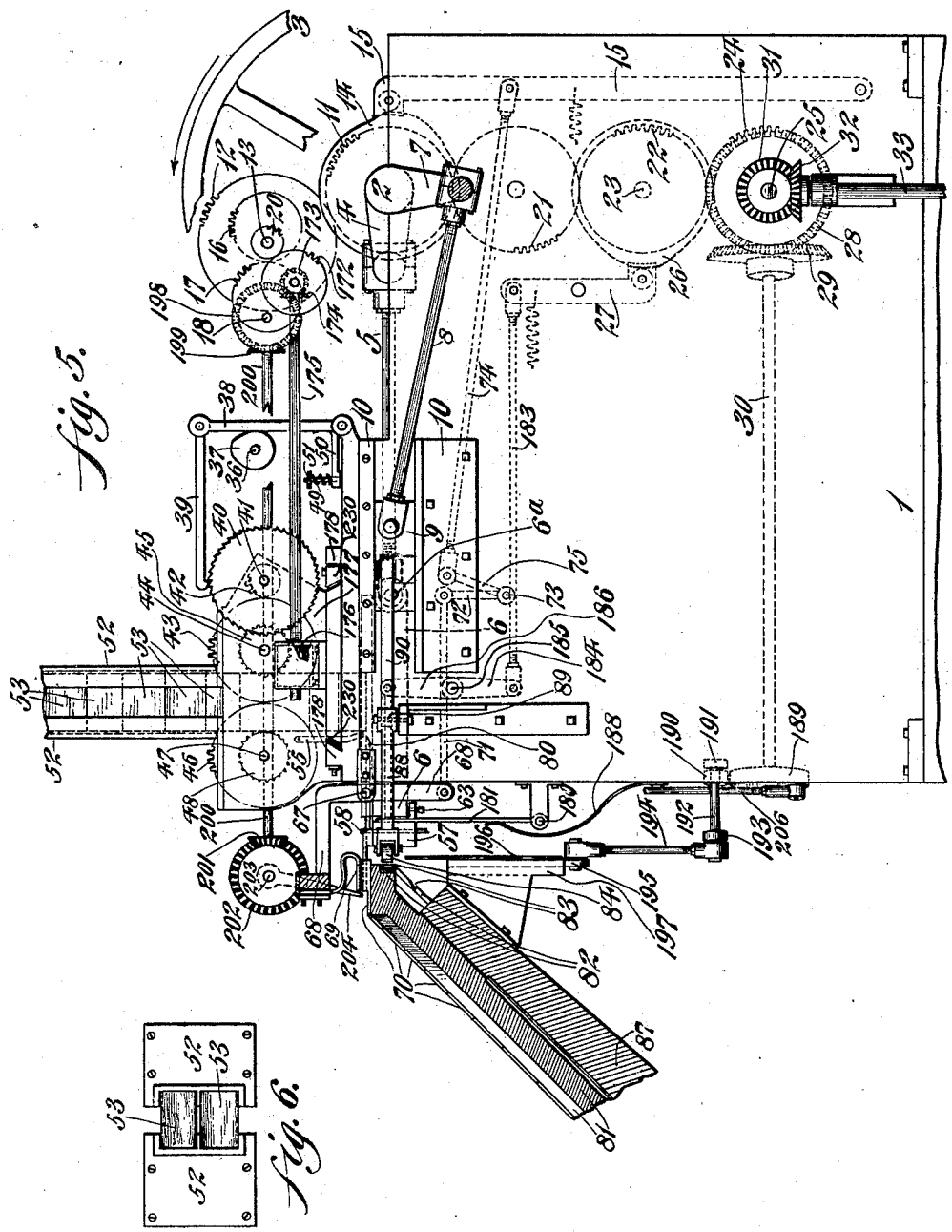

No. 703,154. Patented June 24, 1902.
F. SCHAFER.
MATCH MAKING MACHINE.
(Application filed Feb. 26, 1901.)
(No Model.)
24 Sheets—Sheet 6.
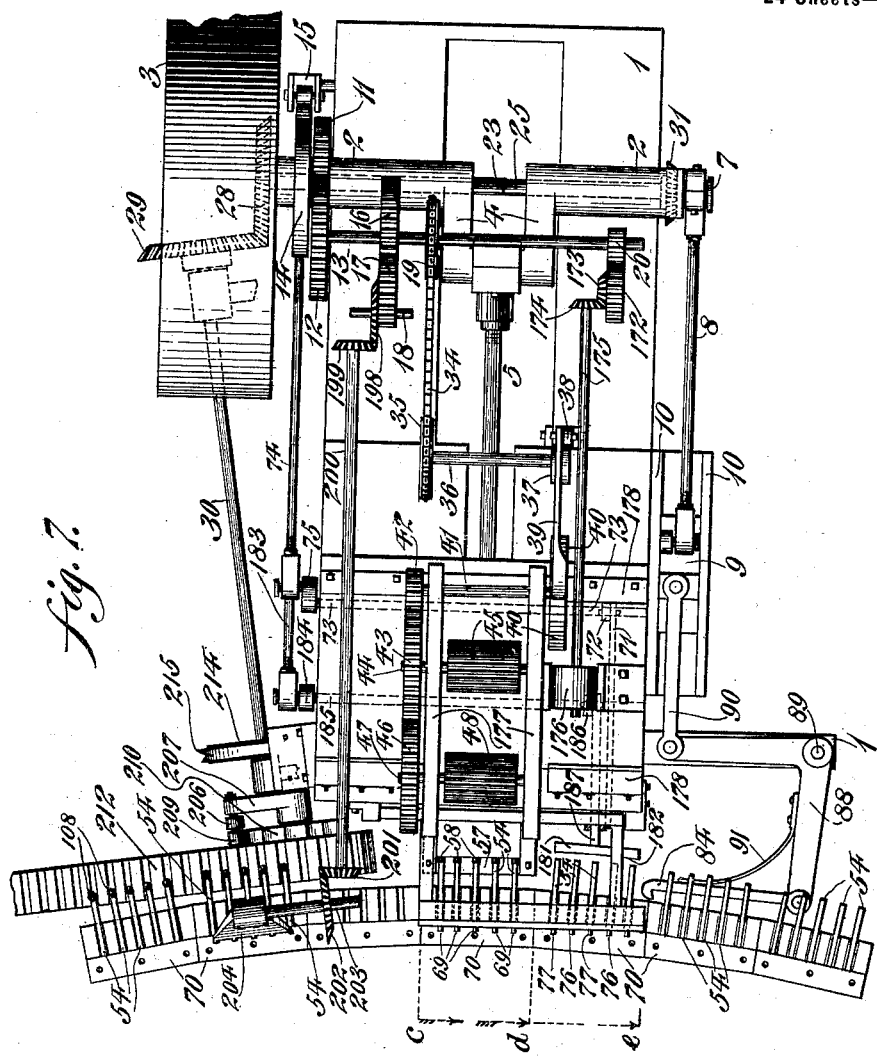
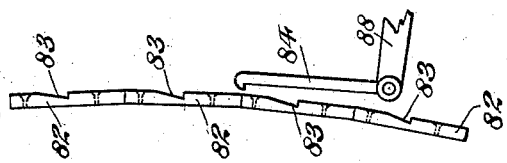
Witnesses
Inventor
Frank Schafer
By Diederoheim & Fairbanks
Attorneys

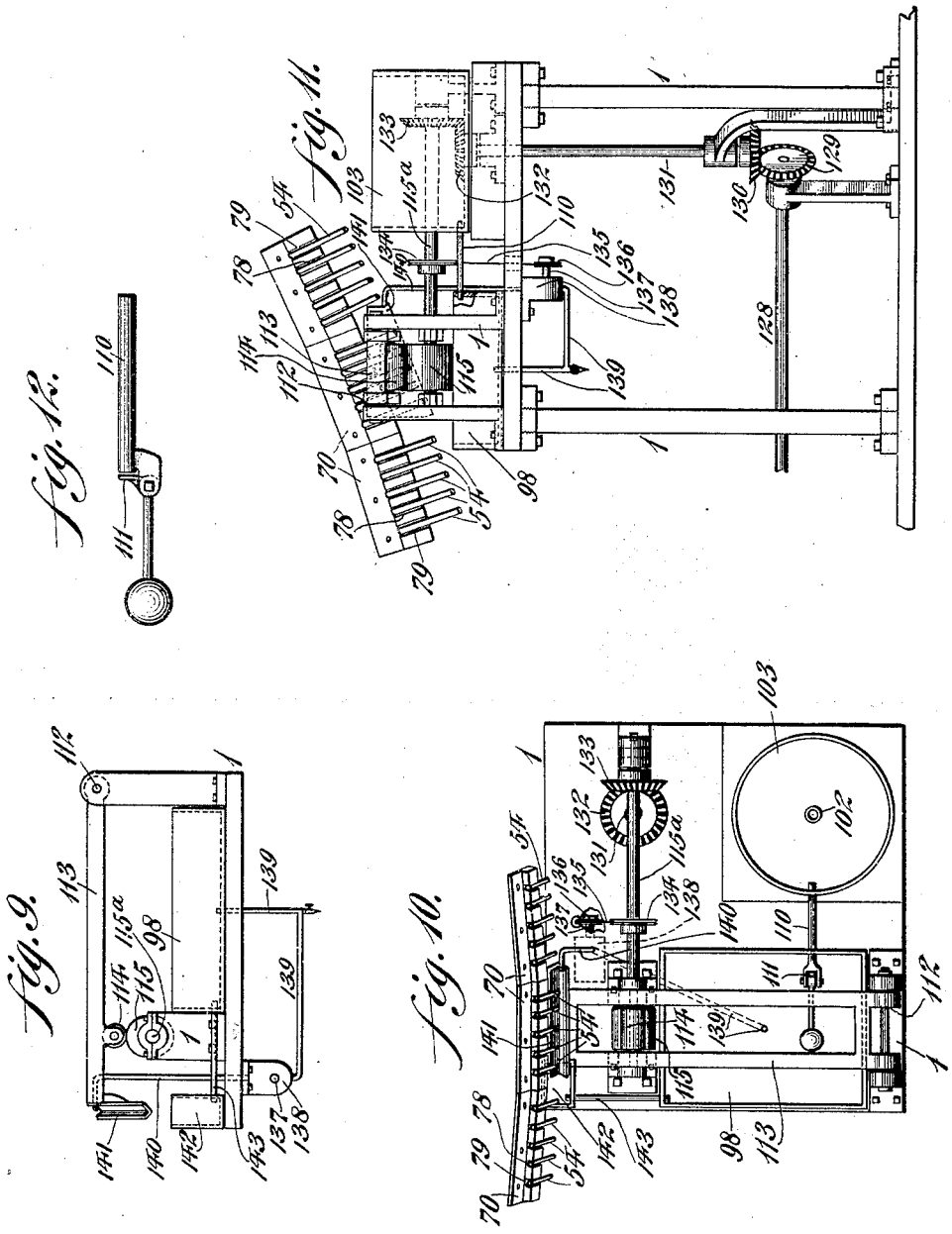

No. 703,154. Patented June 24, 1902.
F. SCHAFER.
MATCH MAKING MACHINE.
(Application filed Feb. 26, 1901.)
(No Model.) 24 Sheets—Sheet 8.
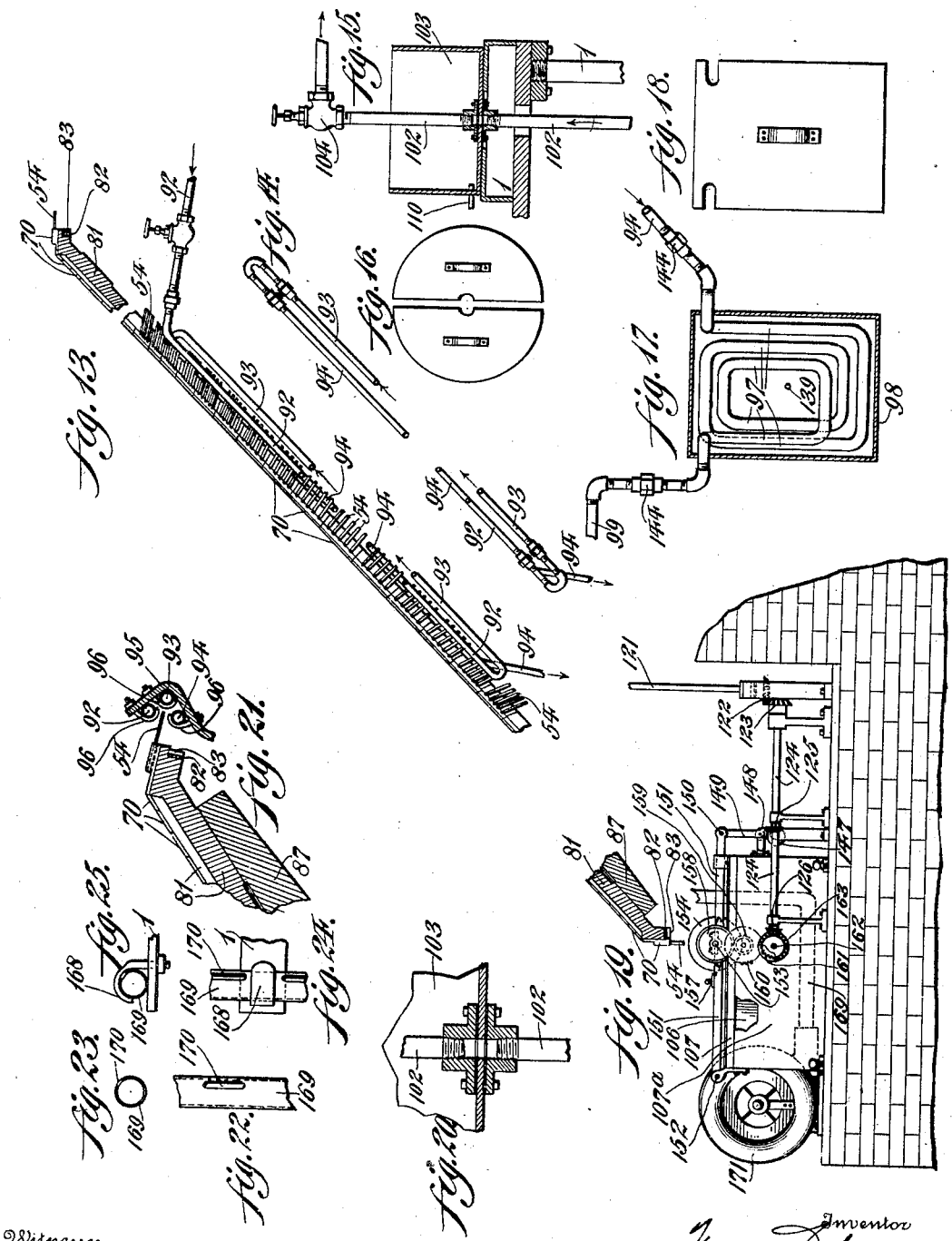

No. 703,154. Patented June 24, 1902.
F. SCHAFER.
MATCH MAKING MACHINE.
(Application filed Feb. 26, 1901.)
(No Model.) 24 Sheets—Sheet 9.
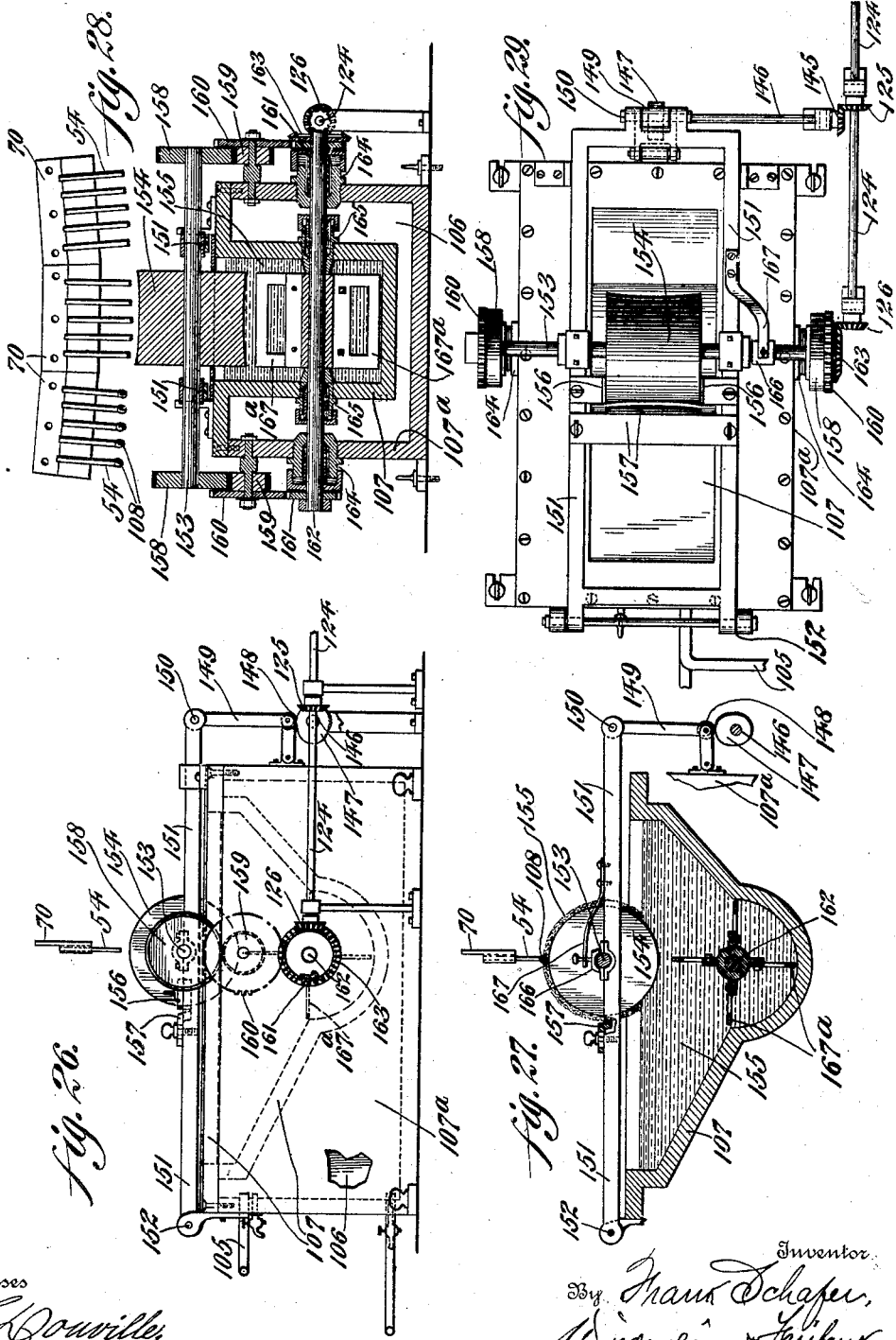

No. 703,154. Patented June 24, 1902.
F. SCHAFER.
MATCH MAKING MACHINE.
(Application filed Feb. 26, 1901.)
(No Model.) 24 Sheets—Sheet 10.
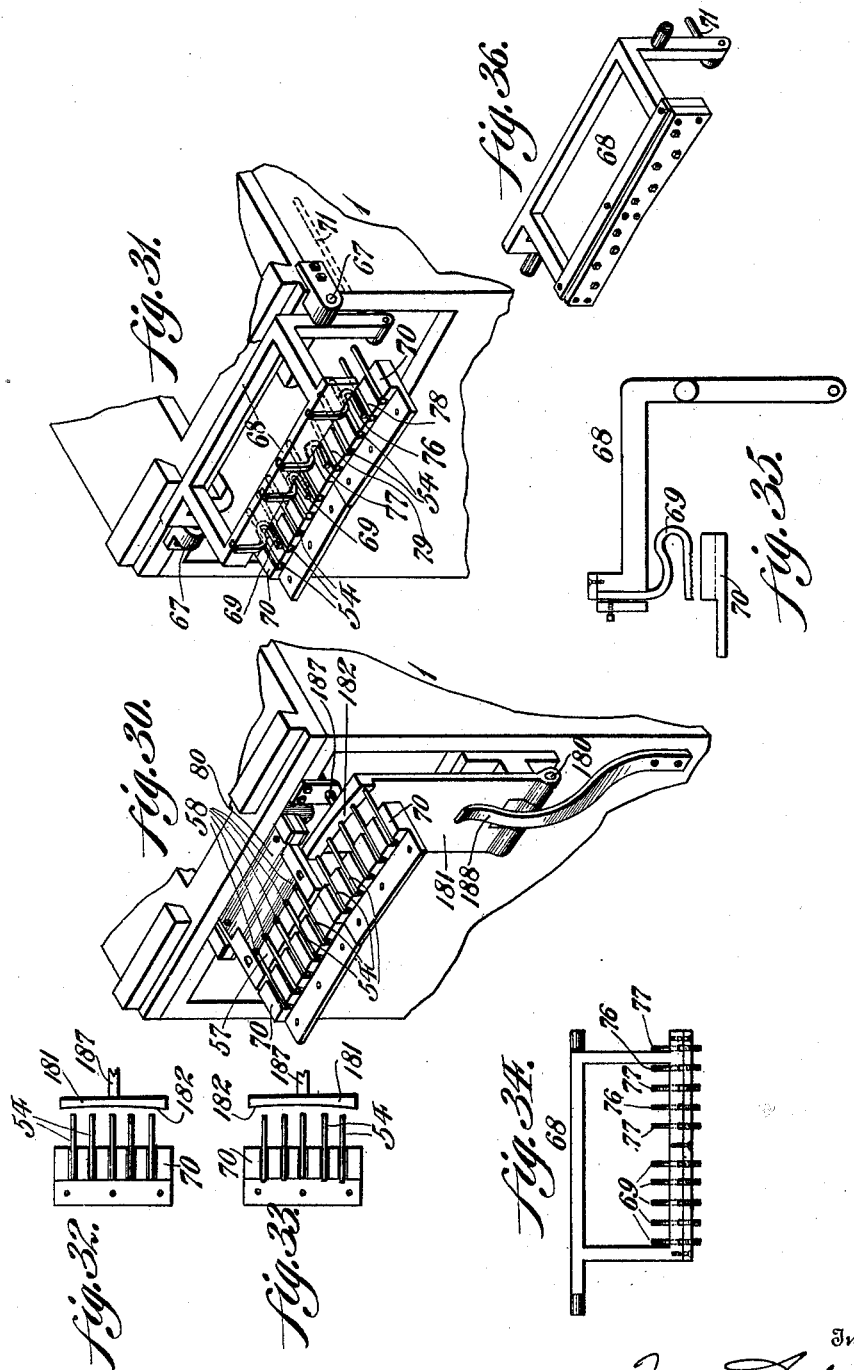

No. 703,154. Patented June 24, 1902.
F. SCHAFER.
MATCH MAKING MACHINE.
(Application filed Feb. 26, 1901.)
(No Model.) 24 Sheets—Sheet 11.
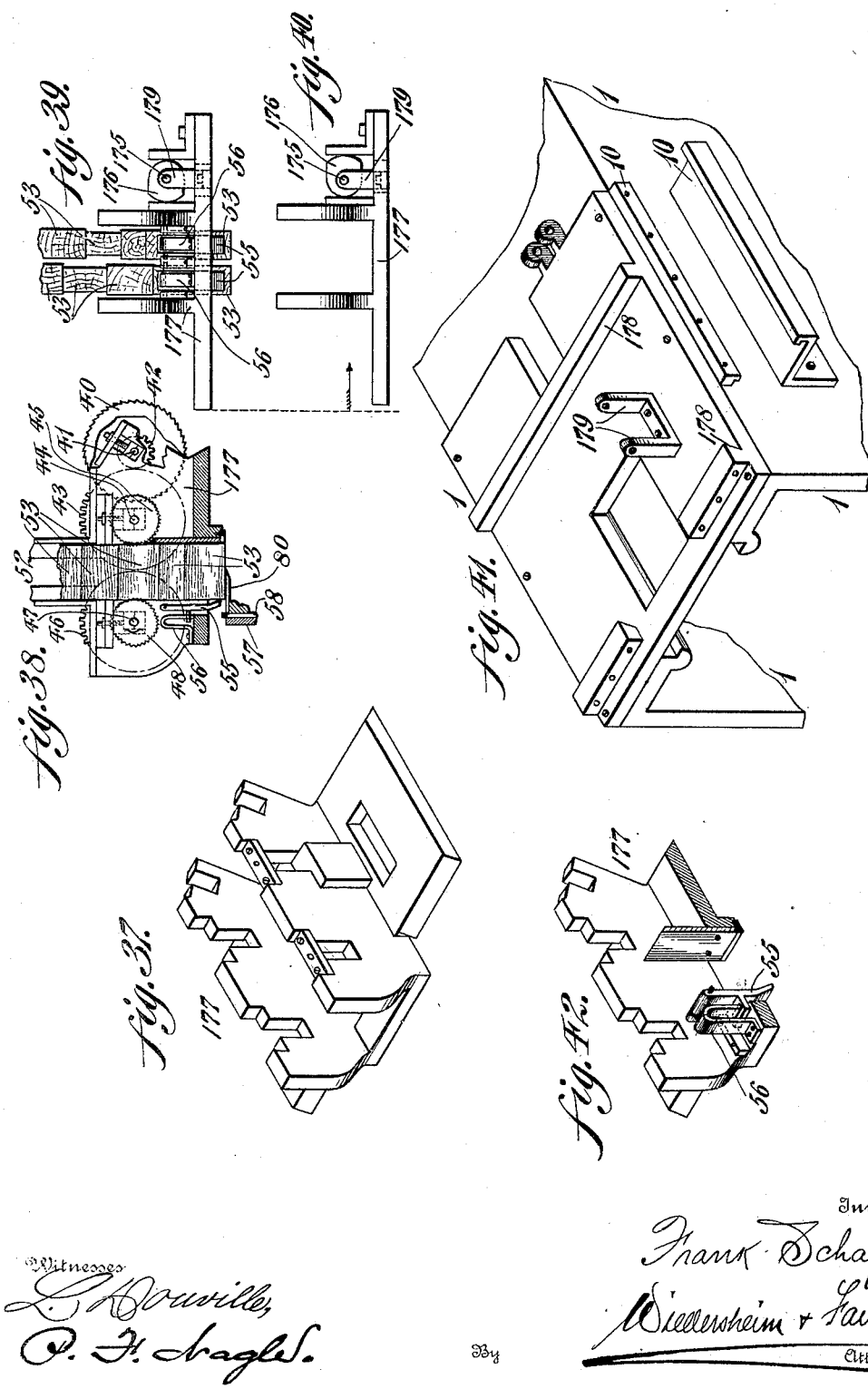
Witnesses
Inventor
Frank Schafer
Attorneys

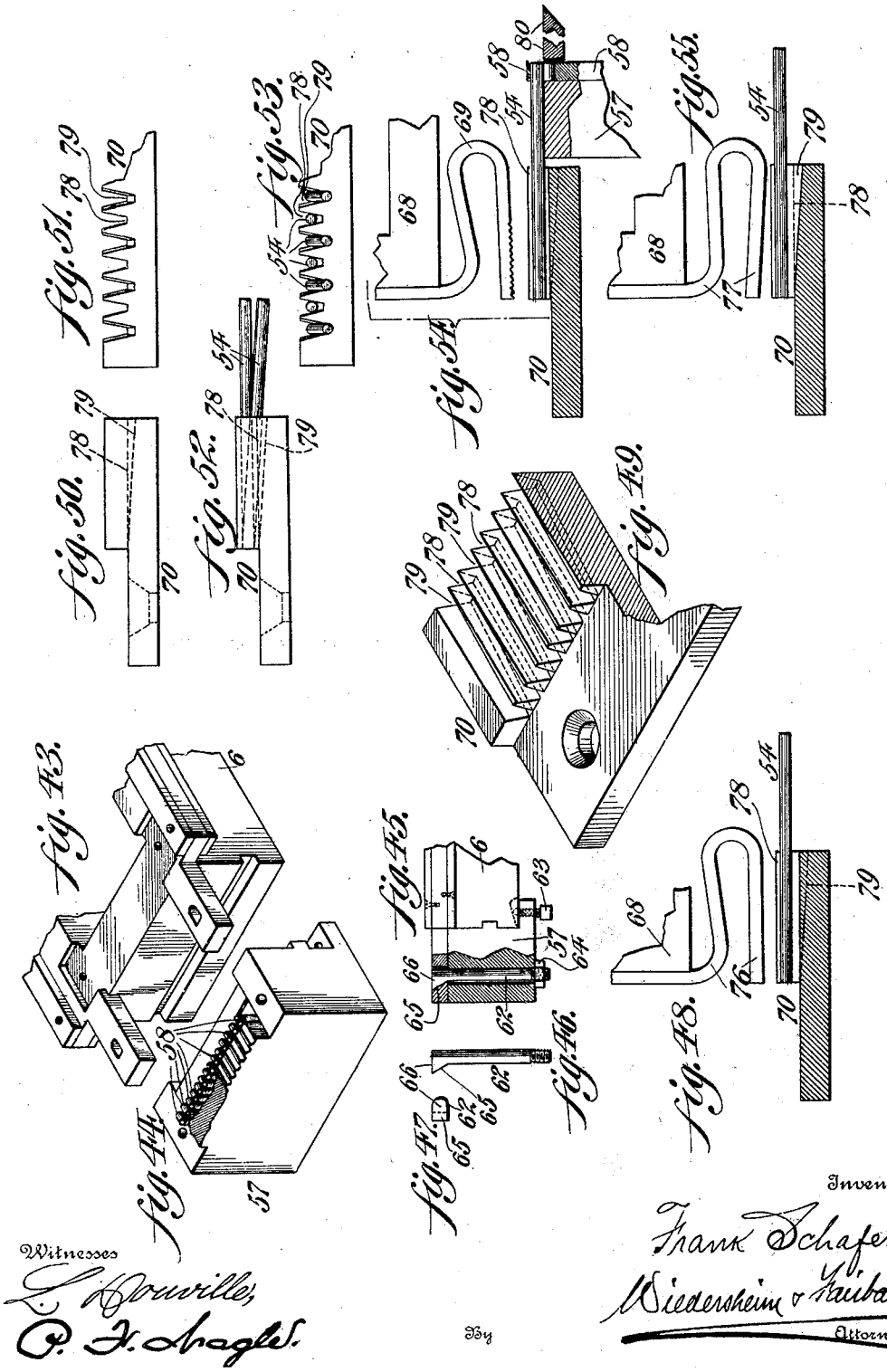

No. 703,154. Patented June 24, 1902.
F. SCHAFER.
MATCH MAKING MACHINE.
(Application filed Feb. 26, 1901.)
(No Model.) 24 Sheets—Sheet 13.
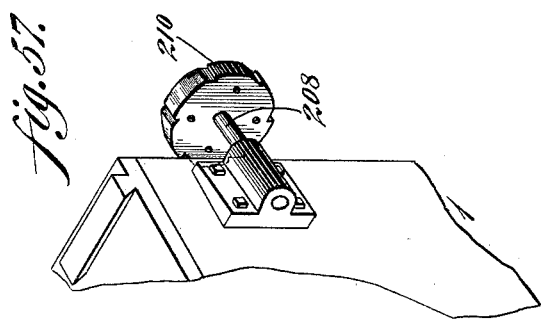
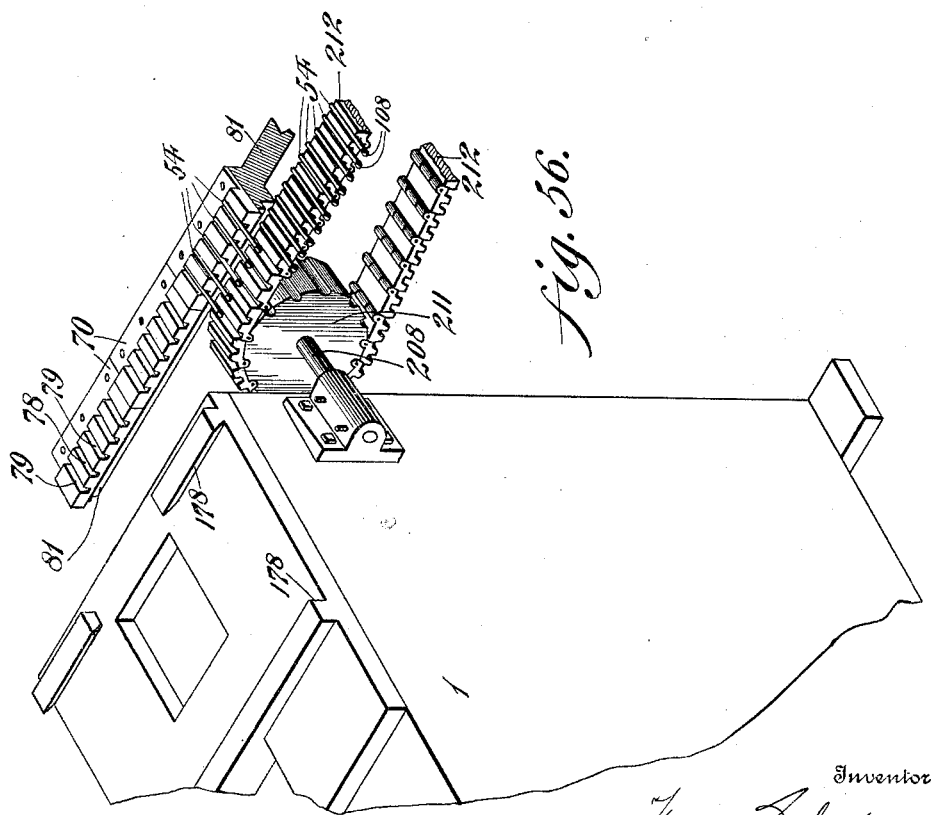

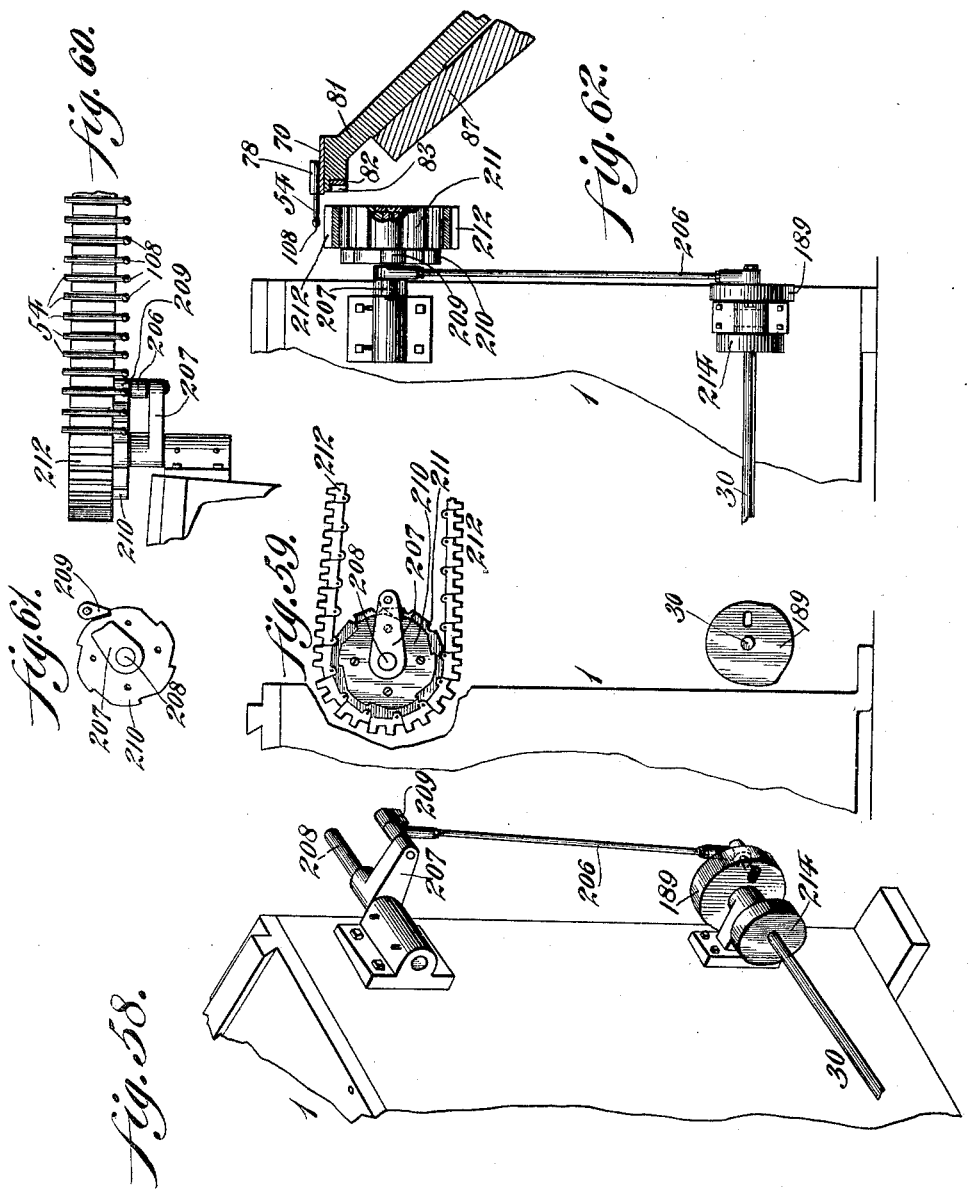

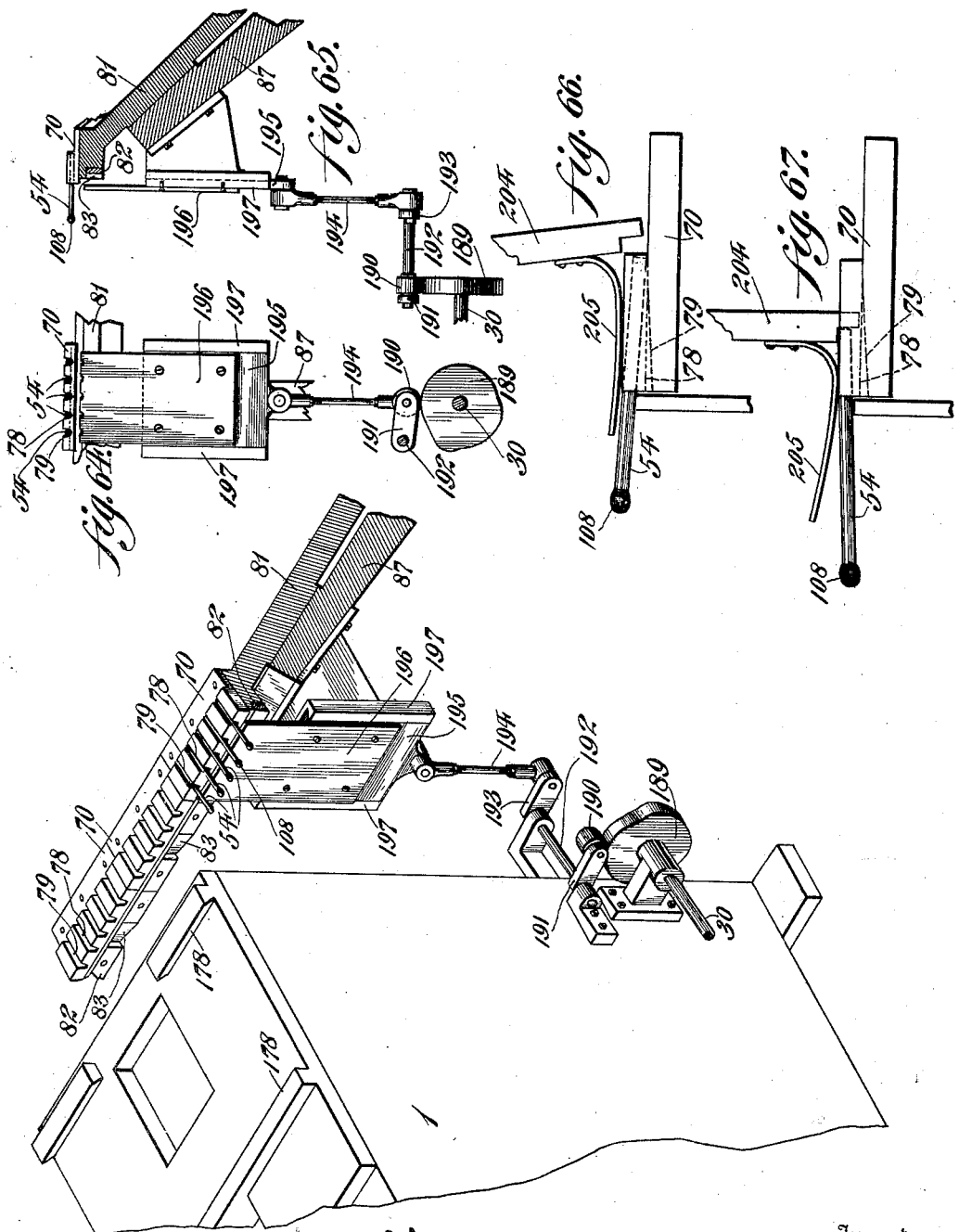

No. 703,154. Patented June 24, 1902.
F. SCHAFER.
MATCH MAKING MACHINE.
(Application filed Feb. 26, 1901.)
(No Model.) 24 Sheets—Sheet 16.
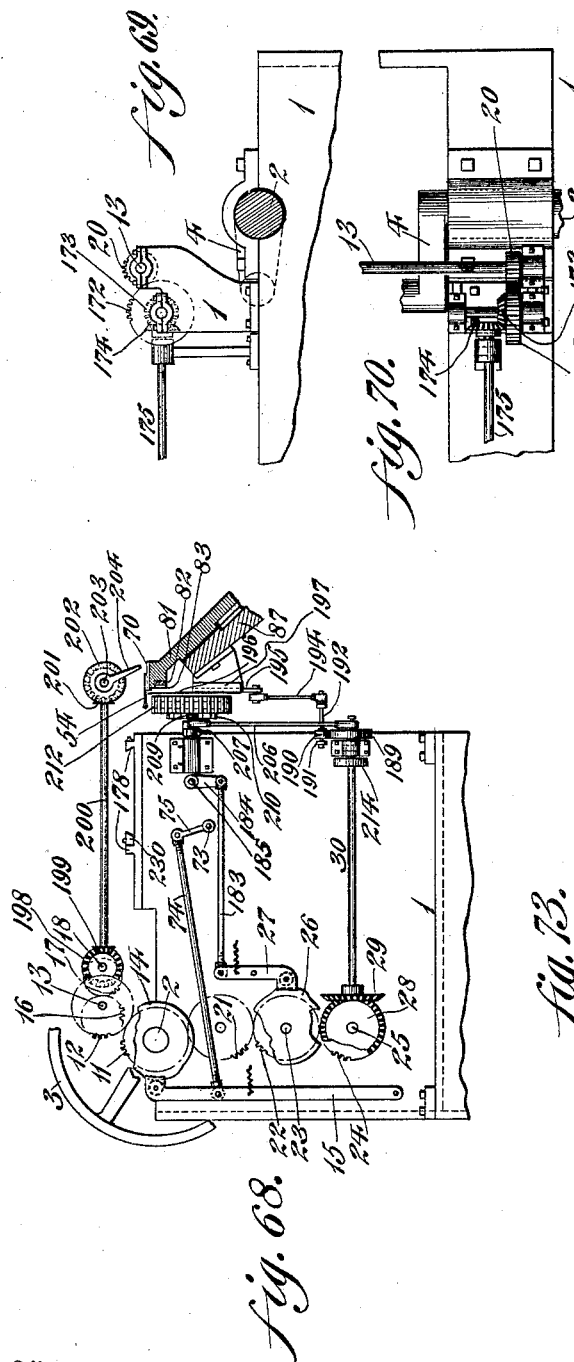
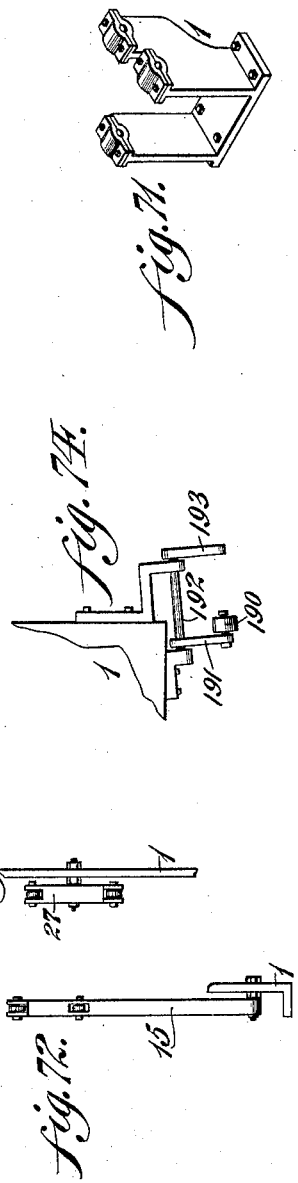
Witnesses
Inventor
Frank Schafer,
By Biedersheim & Fairbanks
Attorneys No. 703,154. Patented June 24, 1902.
F. SCHAFER.
MATCH MAKING MACHINE.
(Application filed Feb. 26, 1901.)
(No Model.) 24 Sheets—Sheet 17.
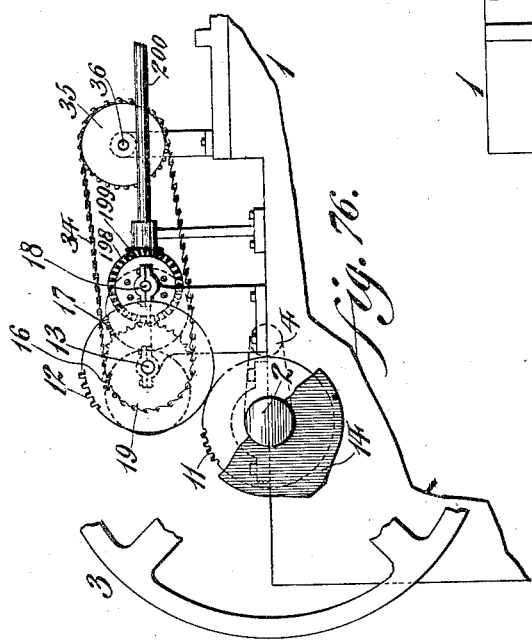
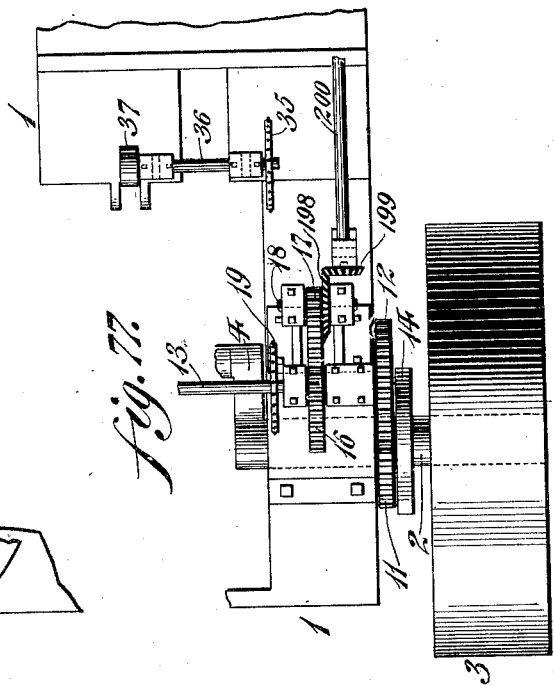
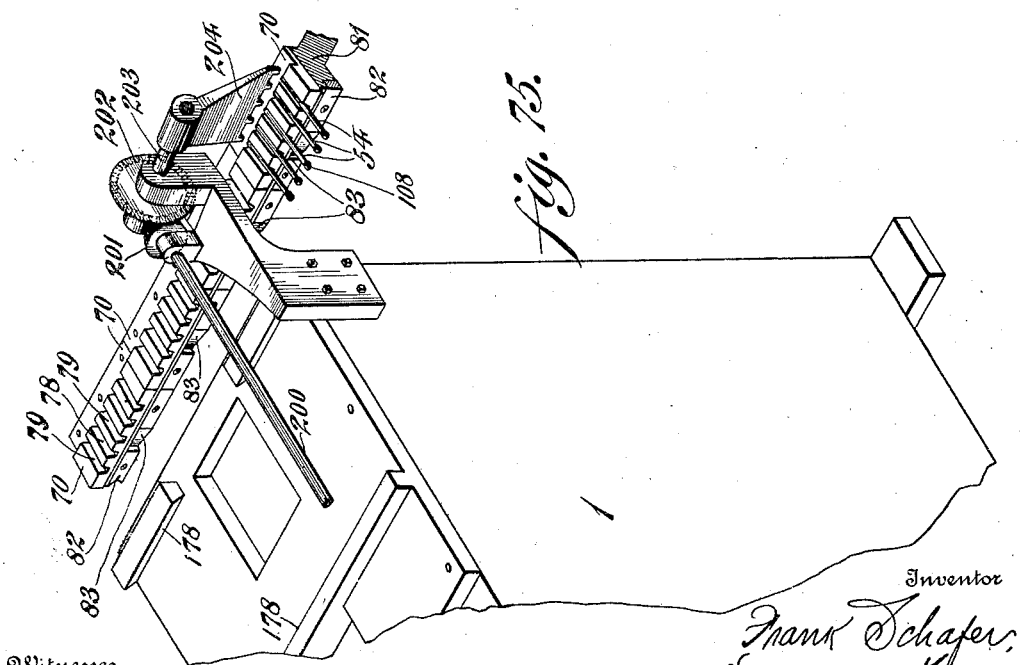

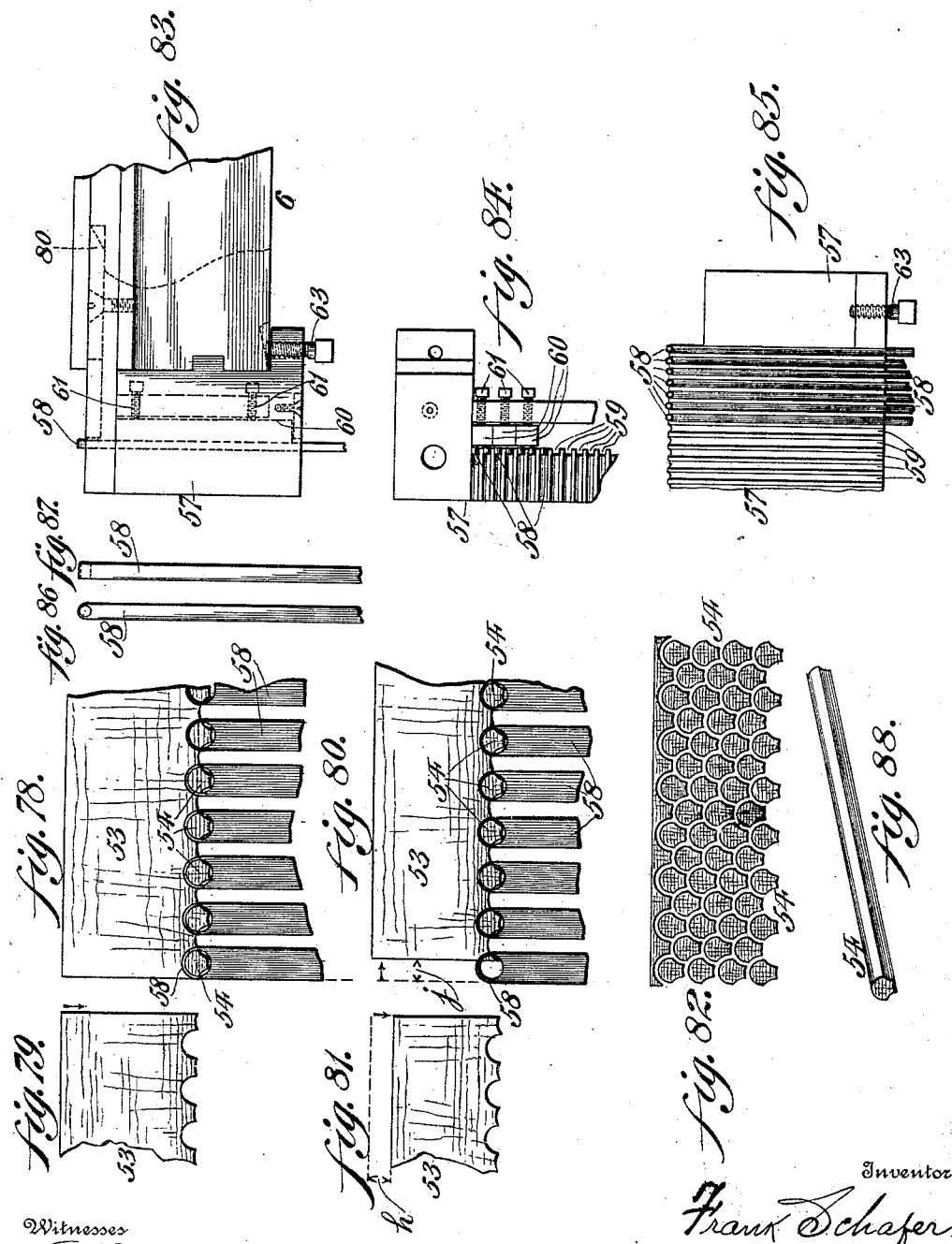

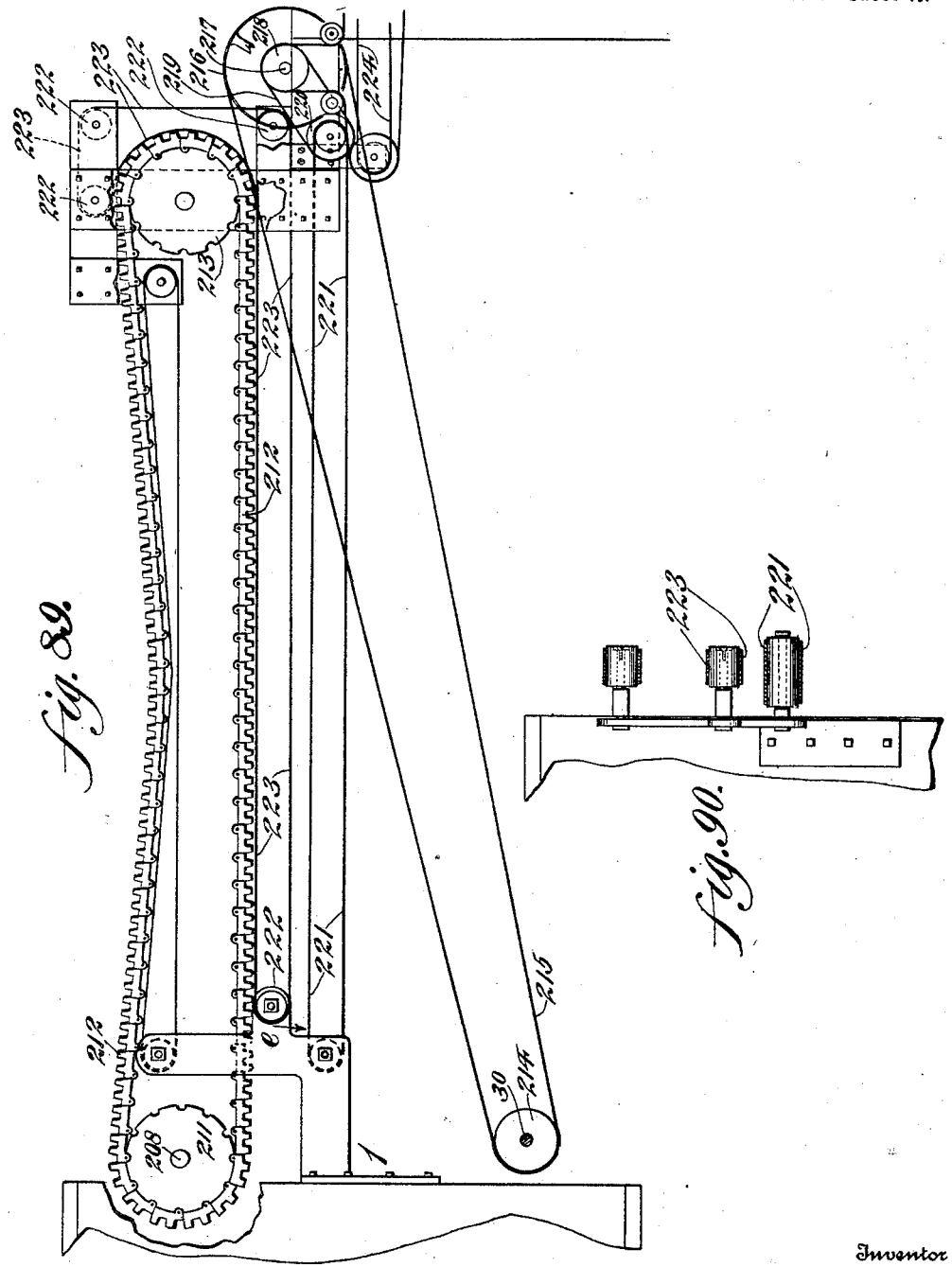

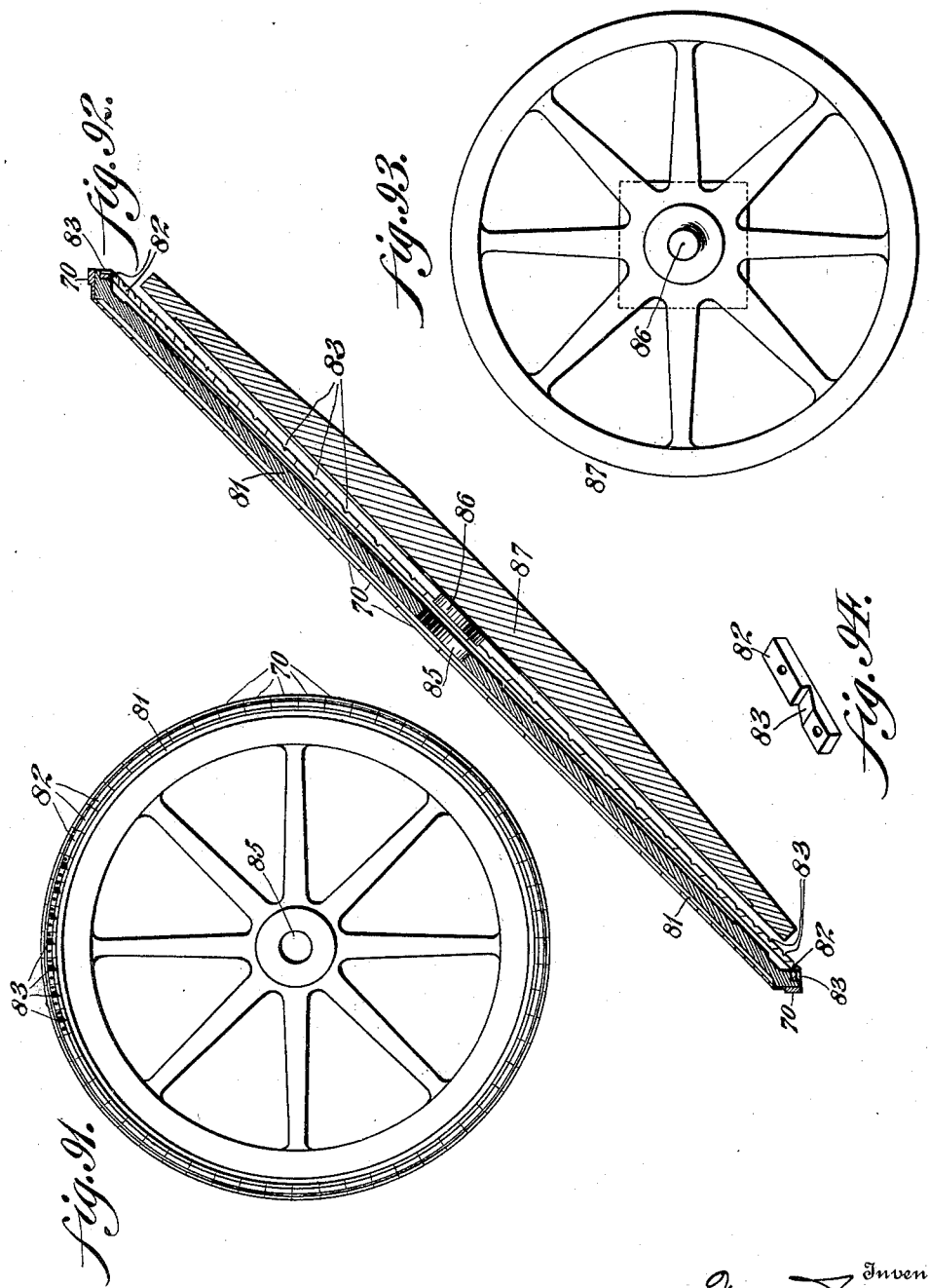

No. 703,154. Patented June 24, 1902.
F. SCHAFER.
MATCH MAKING MACHINE.
(Application filed Feb. 26, 1901.)
(No Model.) 24 Sheets—Sheet 21.
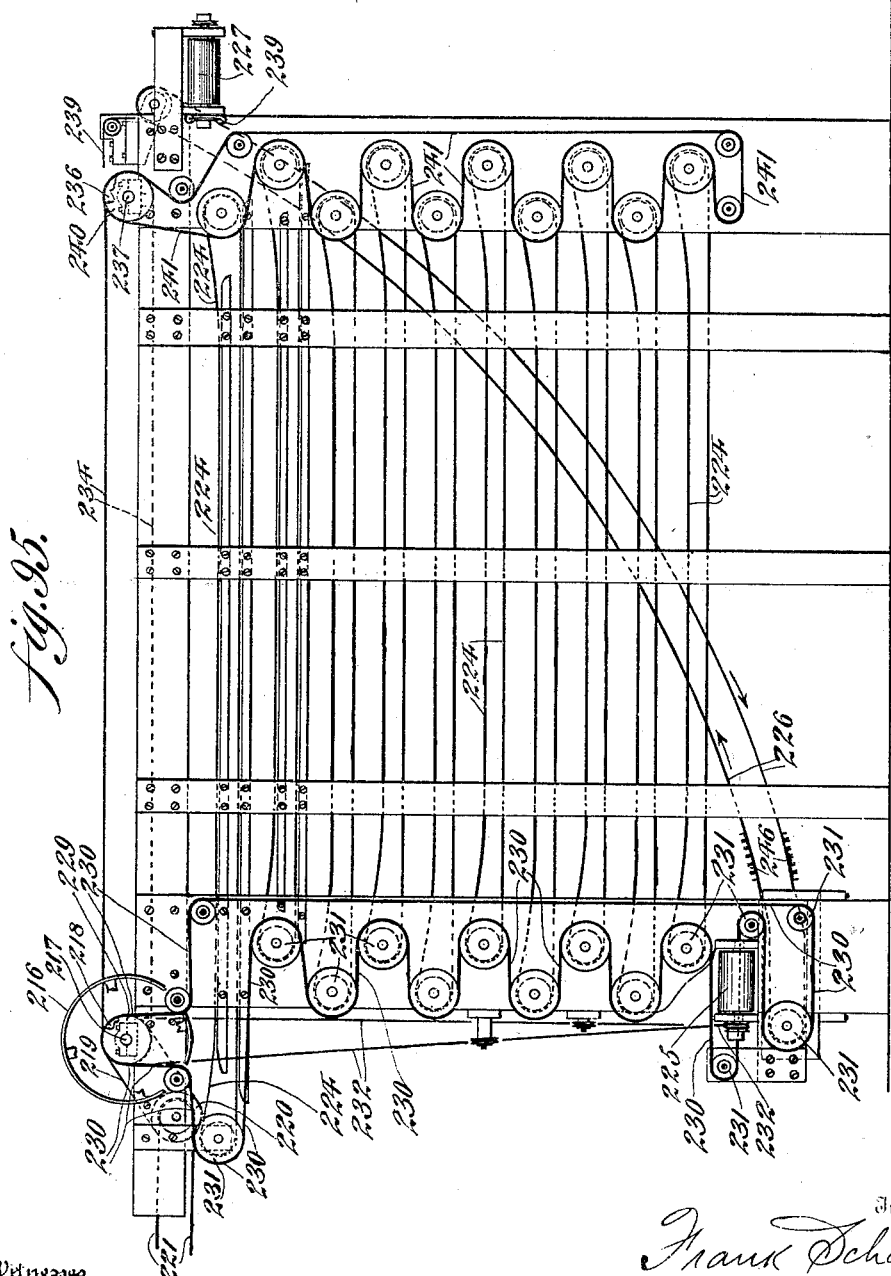

No. 703,154. Patented June 24, 1902.
F. SCHAFER.
MATCH MAKING MACHINE.
(Application filed Feb. 26, 1901.)
(No Model.) 24 Sheets—Sheet 22.
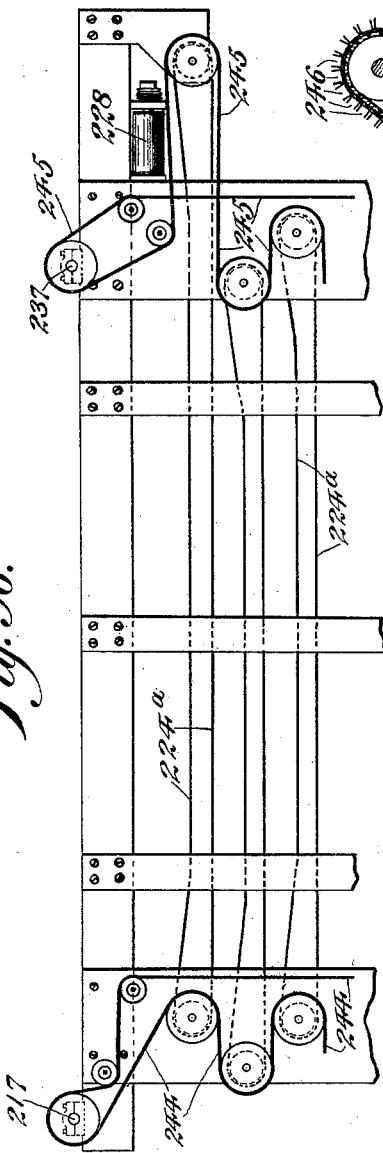
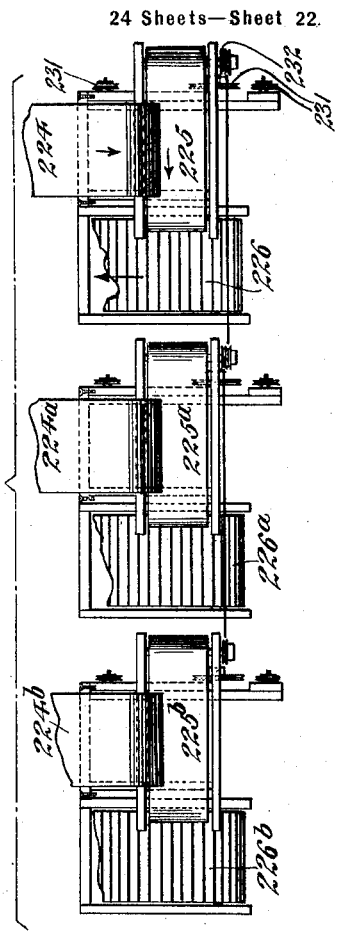
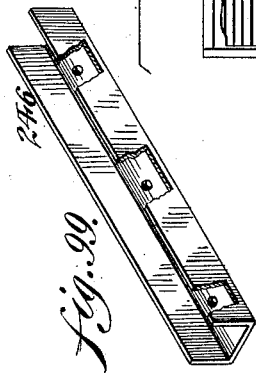
Witnesses
Inventor
Frank Schafer,
By Wiedersheim & Fairbanks
Attorneys

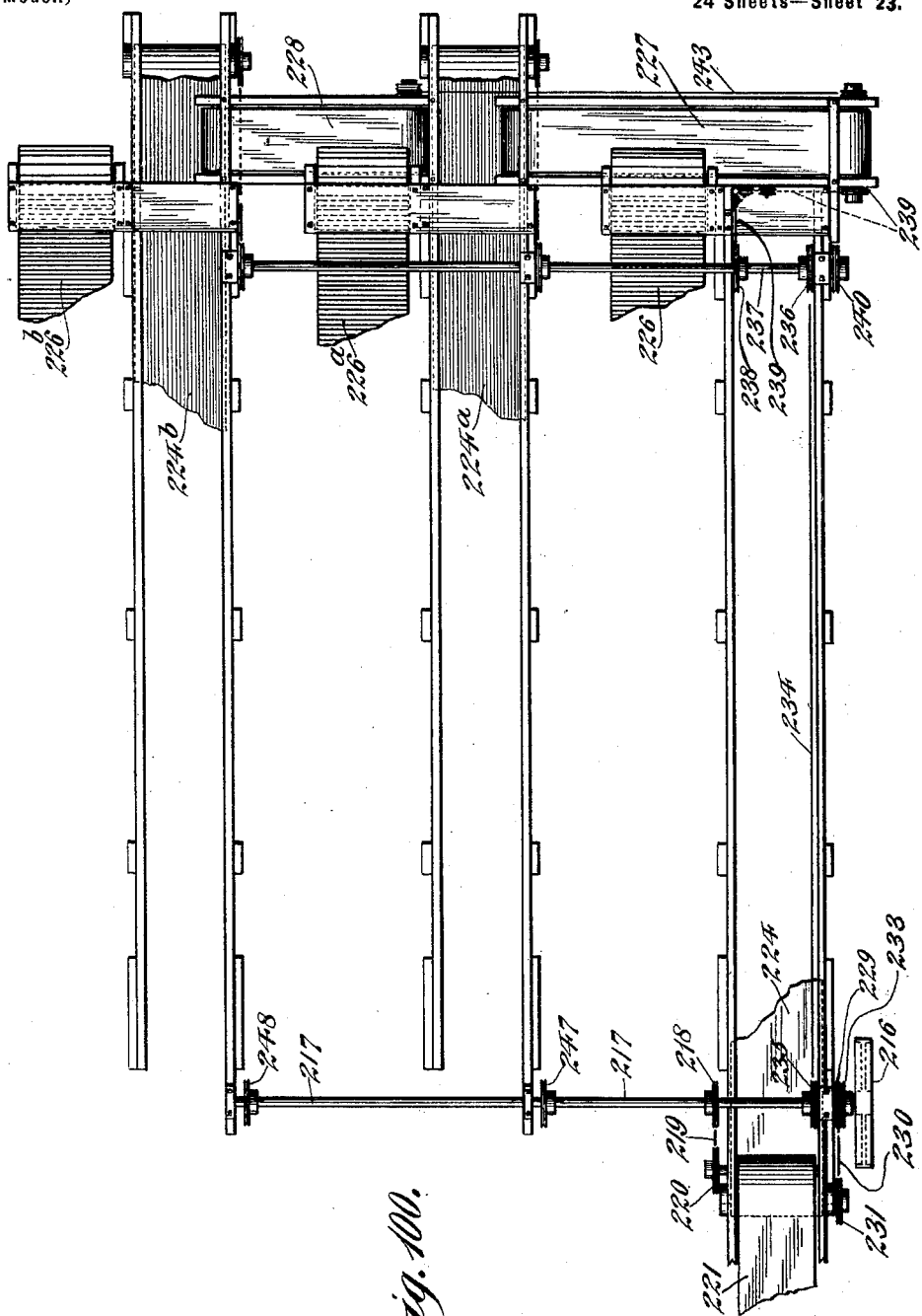

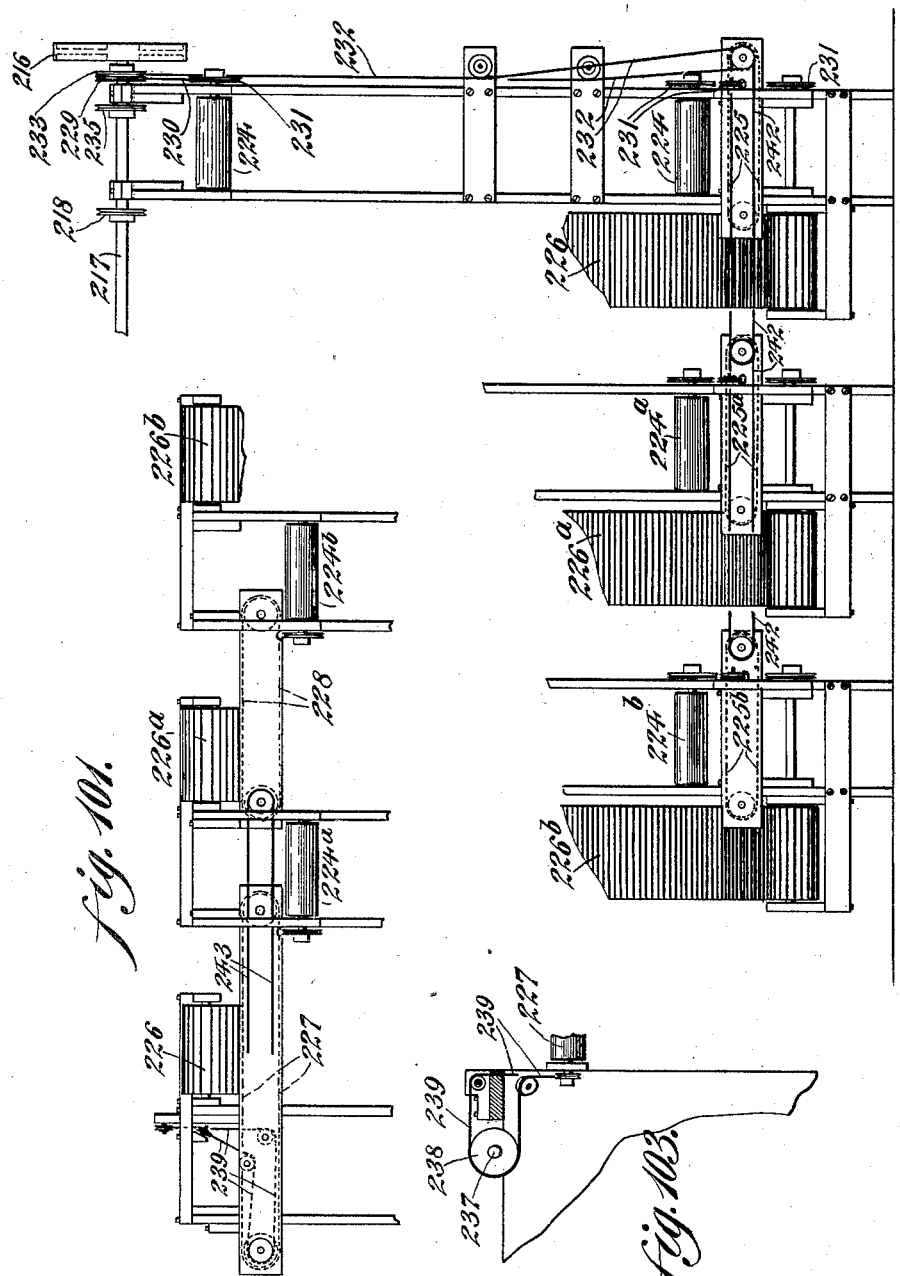

UNITED STATES PATENT OFFICE.

FRANK SCHAFER, OF PHILADELPHIA, PENNSYLVANIA, ASSIGNOR TO ERNEST HAYWARD FAIRBANKS, OF PHILADELPHIA, PENNSYLVANIA.

MATCH-MAKING MACHINE.

SPECIFICATION forming part of Letters Patent No. 703,154, dated June 24, 1902.

Application filed February 26, 1901. Serial No. 48,932. (No model.)

*To all whom it may concern:*

Be it known that I, FRANK SCHAFER, a citizen of the United States, residing in the city and county of Philadelphia, State of Pennsylvania, have invented a new and useful Improvement in Match-Making Machines, which improvement is fully set forth in the following specification and accompanying drawings.

My invention relates to improvements in match-making machines; and it consists of means whereby splints are cut from blocks of wood and the latter are fed both in vertical and horizontal directions, so as to cause said blocks of wood to occupy proper positions relatively to the cutters which produce the splints, and also means for holding firmly in position said blocks when the cutting of splints is being performed.

It also consists of means for feeding the splints to a conveyer and so adjusting the former relatively to each other within the conveyer that it is impossible to form what is known as "double-head matches," which is equivalent to two or more matches whose heads are all combined in one.

It also consists of means for retaining the splints in the conveyer while the cutters are being removed from the former.

It also consists of means for causing the splints within the conveyer to pass between pipes, which are preferably heated by steam and so located relatively to each other that when the splints are caused to pass between said pipes they are thoroughly dried and heated, so as to be in a proper condition to receive the wax.

It also consists of means for applying the wax to the splints.

It also consists of means for automatically opening and closing a valve which controls the communication between a reservoir adapted to contain melted wax and a hopper, so that when said hopper requires an additional supply of melted wax the level of the melted wax within said hopper will cause said valve to open, whereupon wax will flow from the reservoir into the hopper, and when a sufficient quantity of wax from the reservoir has been admitted into the hopper said valve is closed, owing to the increased height of the level of the melted wax within said hopper, whereupon an approximately constant level of the melted wax is maintained within said hopper.

It also consists of means for applying the melted wax to the splints and means for thoroughly mixing the composition upon which the heads of the matches are produced and also means for heating to the proper temperature the composition above referred to.

It also consists of means for causing the headed splints or matches to pass through an air-blast, so as to cause said heads to become "set."

It also consists of means for loosening the matches from their firm positions in the conveyer prior to being removed therefrom by an ejector, which causes the matches after leaving the conveyer to drop upon an endless chain or apron and be directed by the same to a series of endless aprons, so as to insure the thorough drying of the heads of the matches before the latter are discharged from the machine preparatory to being put into boxes.

Figs. 2 and 3 represent a partial plan view of the machine, the drying-aprons 224 not shown fully. (See Figs. 7, 10, 29, 30, 31, 41, 70, 77, 91, 93, 100 for more detailed views.)

Fig. 4 represents a partial side view of the machine. (See Figs. 5, 13, 19, 26, 38, 92 for more detailed views.)

Fig. 5 represents an enlarged side view of the splint-cutting machine and a portion of the beveled circular conveyer seen in Fig. 4.

Fig. 6 represents a plan view of two guide-plates, which are securely fastened to the top of the carrier seen in Figs. 37, 38, 39, 42, and are for the purpose of guiding two rows of blocks of wood between the feed-rollers of the splint-machine.

Fig. 7 represents a plan view of the splint-cutting machine seen in Fig. 5.

Fig. 8 represents a plan view of the plates which are securely fastened to the under side of the conveyer and which have the niches cut in, as seen at 83, to form at regular intervals teeth similar to those of a ratchet-wheel.

Fig. 9 represents an enlarged side view of the waxing mechanism.

Fig. 10 represents a plan view of the waxing apparatus seen in Fig. 9, showing the plates holding the splints in place, which are not shown in Fig. 9.

Fig. 11 represents an end view as seen in Fig. 10.

Fig. 12 represents a side view of the float-valve used in keeping a steady supply of wax in the lower reservoir.

Fig. 13 represents a partial side view of the steam-pipes which are used to heat the splints previous to waxing, the conveyer and splints shown as seen in Fig. 4.

Fig. 14 represents a partial side view of the pipes seen in Fig. 13, showing how after the pipes are bent to the required radius they are fastened together by means of unions.

Fig. 15 represents a central vertical section of the first wax-reservoir, showing the method of fastening the steam-pipes which pass through it.

Fig. 16 represents a plan view of a cover for said reservoir in two parts.

Fig. 17 represents a plan view of the lower reservoir, in which the wax is kept at above the boiling-point and which is directly applied to the splints, the pipes being conveniently connected by means of unions.

Fig. 18 represents a plan view of the cover therefor.

Fig. 19 represents a partial side view and partial vertical section of the dipping apparatus and circular conveyer. (See Fig. 4.)

Fig. 20 represents, on an enlarged scale, a sectional view of the parts seen in Fig. 15.

Fig. 21 represents a vertical section of a portion of the spider circular conveyer splint-holding plate and the steam-pipes, said pipes being clamped to an angle-bracket, as shown, the back of the three pipes being covered by asbestos, the splint passing between the pipes, as shown, but not touching the same.

Fig. 22 represents a portion of the pipe, showing slot-openings for the escape of air to dry or set the heads of matches after the same have been dipped.

Fig. 23 represents a transverse vertical section of the pipe seen in Fig. 22.

Fig. 24 represents a plan view of the bracket and hook for holding in proper position the pipe seen in Fig. 22.

Fig. 25 represents a side view thereof.

Fig. 26 represents, on an enlarged scale, a side view of the apparatus for putting the heads on the splints, showing a splint-holding plate with splints held in proper position over the dipping-roller. It also shows the pipes for the admittance of hot water or steam to keep the composition at the proper consistency.

Figure 1:
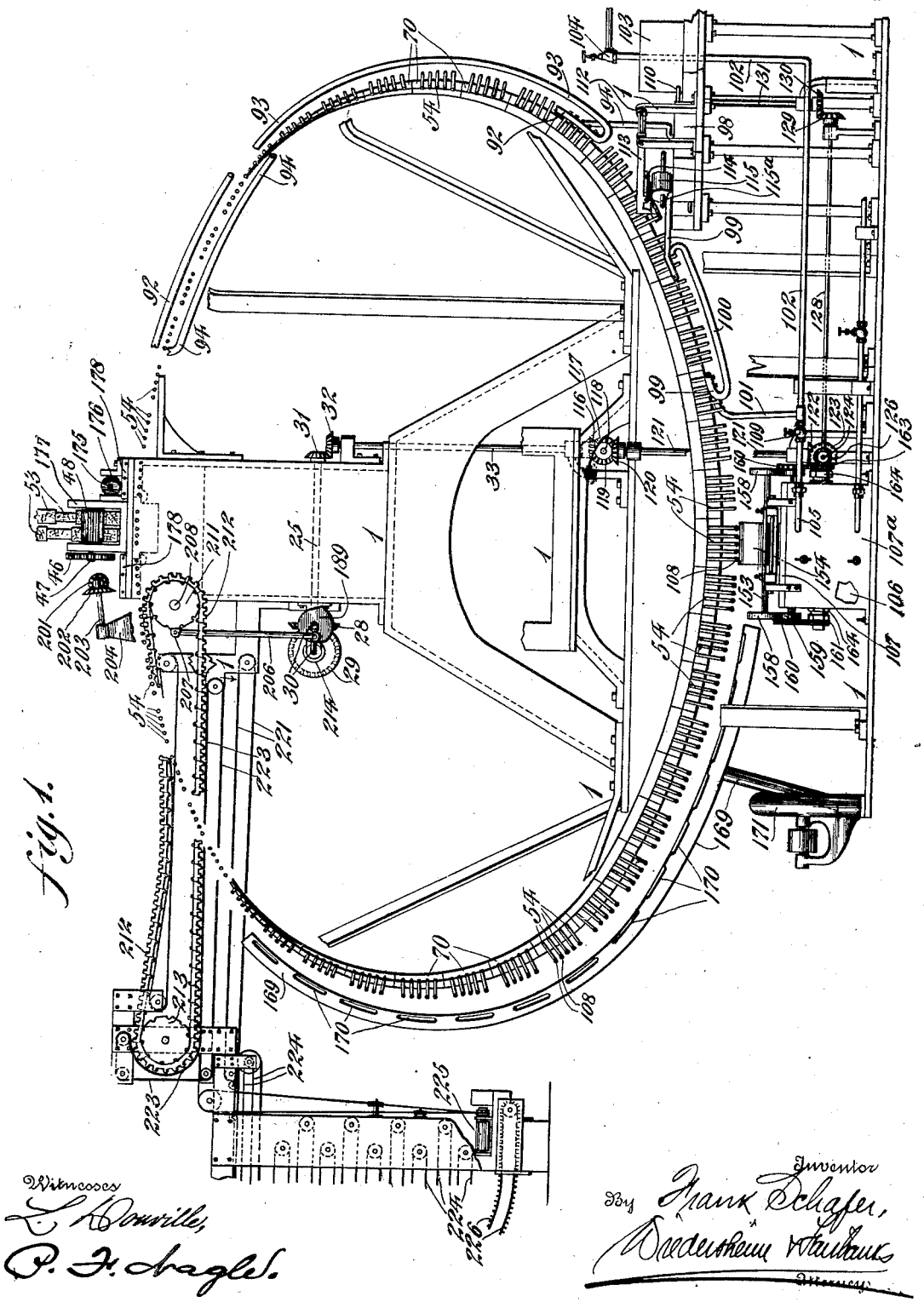
Figure 1 represents a partial end view of the machine with the parts seen in Figs. 2, 4, 5, 7, 30, 31, 43, 47, 49, 56, 63, 89, 91, 92, 93, not clearly shown, these parts being detached or broken (partial) in Fig. 1, so as to give a plain view of the working of the machine.
Figure 2:
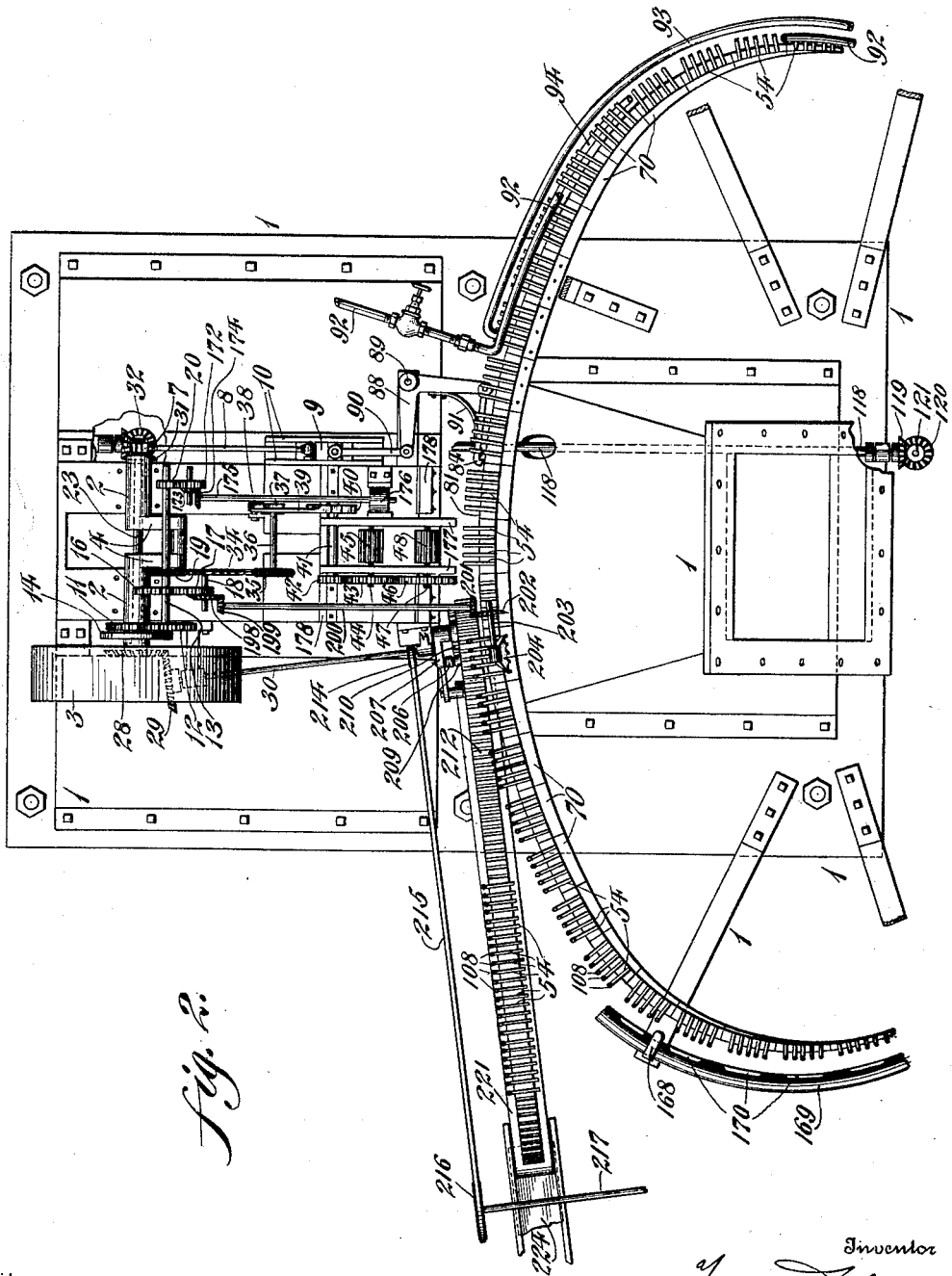

Fig. 27 represents a partial vertical section of the reservoir containing the composition as seen in dotted lines in Fig. 26. In this figure is seen the mixer at the bottom of the reservoir and the dipping-roller in the act of dipping a plate of matches, the cam 147 having lifted the rocker-frame on which is mounted the dipping-roller, said roller having stopped rotating as soon as lifted by the cam 147 and prevented from rotating by the shoe and spring 166 and 167.

Fig. 28 represents a central vertical section of the mechanism seen in Fig. 26. In this view is seen the dipping-roller securely fastened to a shaft having on its outer ends the friction-wheels covered with leather, which are in contact with the smaller friction-wheel loosely mounted on the stud shown, said smaller friction-wheel securely fastened to the gears 160, which mesh with gears 161, securely fastened on the shaft, on which is also fastened the mixer, said shaft rotating in the four stuffing-boxes shown, the inner stuffing-boxes preventing the composition and hot water from coming in contact with one another and the outer stuffing-boxes preventing the leakage of water.

Fig. 29 represents a plan view of Fig. 26, showing the means for driving the same.

Fig. 30 represents a perspective view of an end of the splint-cutter and of two of the plates for holding splints and the splint-cutter in the act of placing splints in the grooves of said plate. It also shows the concave-faced plate or evener.

Fig. 31 represents a perspective view of the rocker-frame, having the springs or fingers in place over two splint-holding plates for plainness of view, only two being shown to each plate. For more detailed views of said fingers see Figs. 48, 54, 55.

Fig. 32 represents a plan view of a match-holding plate having splints in same and showing the concaved-faced evener, but previous to the action of said evener.

Fig. 33 represents a plan view of the parts seen in Fig. 32, showing the position of the splint after the action of said evener, the ends of the splints now conforming to the concave face of said evener.

Fig. 34 represents a plan view of the rocker-frame having the fingers in place, held by set-screws.

Fig. 35 represents, on an enlarged scale, an end portion of the rocker-frame, showing the method of holding the fingers in proper position over the splint-holding plate, the fingers shown being one of those employed over the first plate which receives the splints from the splint-cutter. (The difference between the fingers employed over the first plate and those of the second plate can be seen in Figs. 48, 54, and 55.)

Fig. 36 represents a perspective view of the frame for holding the fingers.

Fig. 37 represents a perspective view of the carrier which supports the fluted rollers which feed downward the block of wood from which the splints are cut.

Fig. 38 represents a partial vertical section of Fig. 37, showing the feed-rollers in place and the pivoted clamp which holds the blocks in place and prevents them from dropping down after they have been fed below the fluted rollers, the pivoted clamp holding the block by means of the pressure exerted by the spring 56.

Fig. 39 represents an end view of the carrier, Fig. 37, with the gear and fluted rollers removed, but showing the blocks of wood in place, held by pivoted clamps and springs, Fig. 38. It also shows the self-locking cam, which moves the carrier in a horizontal direction at every alternate stroke of the splint-cutter, as will be hereinafter explained.

Fig. 40 represents an end view of the parts of Fig. 39, but with the blocks, clamp, and spring removed. In this view is seen the self-locking cam, but in an opposite direction. The motion of the cam is continuously rotary; and it will be seen that a certain part is circular. When the cam is in a locked position during its movement the cutting of the splints takes place.

Fig. 41 represents a perspective view of the frame of the splint-cutting machine, showing the guideway for the cross-head of the splint-cutters, the plate upon which the carrier rests and slides in a horizontal direction, the bracket-bearing for the self-locking cam, the opening for the two rows of blocks and sliding plate and clamp, (see Fig. 42,) and guideways on the side in which slides a cross-head actuated by a crank and connecting-rod, (see Fig. 57,) said cross-head causing the intermittent rotary motion to the circular conveyer, Fig. 7.

Fig. 42 represents a perspective view, partly sectional, of the carrier seen in Fig. 37. In this view is seen the spring 56, pivoted clamp 55, and opposite the clamps 55 the plate against which the blocks are caused to slide on account of the pressure of the spring 56 against the clamp 55 and the downward-feed motion of the fluted rollers, as best seen in Fig. 38.

Fig. 43 represents a perspective view of the back end of the cross-head, to which the cutter-block is attached.

Fig. 44 represents a perspective view of the cutter-block.

Fig. 45 represents a partial side view and a partial vertical section of the cross-head and cutter-block, showing the method of fastening the cutter-block to the cross-head.

Fig. 46 represents a side view of the bolt used, showing the beveled head which on being pulled down by the nut will cause the cutter-block to be clamped tight to the cross-head.

Fig. 47 represents a plan view of the head of the bolt seen in Fig. 46.

Fig. 48 represents a partial side view and partial vertical section of the splint-holding plate, the splint, and finger. In this view is shown the position of the finger ready to move down and force the splint tightly in the groove of the plate 70. (See Fig. 49.)

Fig. 49 represents a perspective view of a portion of the splint-holding plate, showing the arrangement of the groove by making every alternate one deeper at its outer end, the grooves at the inner end being all on one lever.

Fig. 50 represents a side view of the plate, Fig. 49, showing in dotted lines the difference in depth at the outer end of the splint-holding plate.

Fig. 51 represents an end view of a portion of the splint-holding-plate, which also shows the difference in the grooves in said plate 70.

Fig. 52 represents a side view of the plate seen in Fig. 50, with the addition of the splints placed therein. It will be seen that the upper splint is horizontal, corresponding with the horizontal groove, and the lower splint corresponding with the other groove, which is deeper at its outer end, as seen in dotted lines, Fig. 50.

Fig. 53 represents an end view of a portion of the plate and splints seen in Fig. 52, showing plainly how the double heads are avoided.

Fig. 54 represents a partial side view and partial vertical section of the splint-holding plate, splint, and finger. In this figure is shown the splint as it is placed in the plate by the splint-cutter. Above the plate is shown the corrugated finger. When the splint-cutter places the splint in the groove of the plate 70, as shown, the clamp is caused to move down and clamp or press the splint at its outer end into the groove of the plate. The corrugations in said finger 69 press and assist in holding the splint in place until the cutter has moved forward again and left the splints in the plate 70. The finger 69 forms the set which clamps the splints in plate, as seen in Fig. 7, from C to D. Referring to Fig. 54, it can plainly be seen that if the splints were to be forced down into the grooves at the outer end of the plate 70 they would be broken or sheared off at the scalloped part of the cutter-block 57, the clamping only taking place along the corrugated end of the finger, which is slightly lower than that part of the finger which is not corrugated.

Fig. 55 represents a partial side view and a partial vertical section of the plate 70 and finger-clamp frame. In this view is shown the plate 70, cut through at one of the deep grooves 79, a splint in place, and the finger 77 in proper position above it. It will be noticed that the bottom of the finger 77 is parallel with the bottom of the groove 79.

Referring to Figs. 48 and 55, the fingers shown here are used in the rocker-frame, Figs. 31 and 36, and clamp the splints in the plate D to E, Fig. 7, every alternate groove having a finger, (shown in Figs. 48 and 55,) and which press the splint along the full length of that part of the splint that is in the plate 70, thus clamping the splints tightly in the straight grooves, as seen in Fig. 48, and also those in plate 70, groove 79, as shown in Figs. 55, 52, and 53.

Fig. 56 represents a perspective view of the splint-cutting-machine frame, a partial view of the circular conveyer having plates 70 thereon. There is also shown a drum loosely mounted on a shaft, which acts as a stud. On said drum rotates a link chain, whose upper surface has grooves corresponding with the grooves in the splint-holding plate 70. The grooves in this chain are wide enough so that the splint can fall in easily. It will be noticed that the grooves in the chain are directly underneath the matches in splint-holding plate.

Fig. 57 represents a perspective view of the shaft 208 and the ratchet-wheel 210, which is omitted in Fig. 56 for the sake of clearness, and which is securely fastened to the side of the drum 211.

Fig. 58 represents a perspective view of a portion of the frame, showing the shaft 208, Figs. 56 and 57, loosely mounted thereon, the arm 207, at the outer end of which is loosely pivoted the connecting-rod 206 and also the dog 209, the other end of the connecting-rod being loosely pivoted on a bolt which is adjustable in the slot of the crank-disk 189, said crank-disk also acting as a cam for a purpose which will hereinafter be described. Fastened to the shaft which rotates the cam crank-disk 189 is the belt-pulley 214, which drives, by means of a belt, (said belt not being shown in this figure,) the drying-aprons seen in Figs. 89, 95, 96, 97, 100, 101, and 102.

Fig. 59 represents an end view of the chain-drum, Fig. 56, ratchet-wheel, Fig. 57, arm 207, and cam crank-disk 189, as seen in Fig. 58, also a portion of the conveyer-chain.

Fig. 60 represents a plan view of a portion of the link chain, showing the splints thereon.

Fig. 61 represents a side view of the ratchet, Fig. 57, arm 207, which is broken to show the dog in proper position to pull down, so as to move the proper number of grooves of chain forward, so as to allow the next plate 70 of matches to be ejected on the conveyer-chain. In this view it will be seen that the dog 209 will drop in its proper place and catch on the tooth of the ratchet-wheel 210.

Fig. 62 represents a side view of the frame of the splint-cutting machine and the belt-wheel 124, cam crank-disk 189, connecting-rod 206, arm 207, dog 209, ratchet feed-wheel, and a partial sectional view of the drum and link chain, also a sectional view of the spider and circular conveyer, having a splint-holding plate thereon with the match in position, showing the match somewhat above the link chain.

Fig. 63 represents a perspective view of a portion of the frame, the cam crank-disk 189, a pivoted idler 190, running on the same, the roller loosely pivoted on a bolt and securely fastened on one end of an arm 191, the other end of the arm securely fastened to a shaft mounted in suitable bearings. On the other end of said shaft is secured also an arm, at the outer end of which is secured a pin or bolt, on which is loosely pivoted a connecting rod or link, the upper end of said link pivoted to a bolt securely fastened to a plate, which moves vertically in suitable guides securely fastened to the spider on which rotates the circular conveyer. On a portion of the conveyer is shown a splint-holding plate 70, having finished matches thereon. Securely fastened to the plate 195, which is caused to move upward, as stated, by means of the cam 189, is a plate 196, which is placed directly under the finished matches and as close to the end of the plate 70 as convenient, the said plate 196 having slight corrugations at the top to correspond to the matches in the plate 70, the object of the plate 196 being to loosen the matches previous to ejecting them on the conveyer-chain, (shown in Figs. 56, 59, and 60,) the action of the lifting-plate being shown in Figs. 66 and 67. In Fig. 67 the lifting-plate is caused to drop below the level of the lower groove 79 just previous to the ejector 204 coming out of the grooves of the plate 70.

Fig. 64 represents a face view of the lifting-plate as seen in Fig. 63, showing its position under the matches and the corrugations corresponding to the grooves in the plate 70.

Fig. 65 represents a side view of the cam, lifting-plate, and guideways for the same, showing the guideways securely fastened to the spider and also the position of the lifting-plate at the end of the splint-holding plate 70 and directly under the matches, the lifting-plate 196 in Figs. 64 and 65 being in the lowermost position.

Fig. 66 represents a view showing the lifting-plate in its highest position, bringing all the matches on one level, the guard-plate 205 preventing the matches from flying out of the plate 70 as the ejector 204 moves forward and strikes the end of the matches, the lifter dropping a very little, as seen in Fig. 67, the outline of cam, as seen in Fig. 64, showing how this is accomplished.

Fig. 67 represents a view of the parts seen in Fig. 66, but in different positions. In this view is shown the lifting-plate in position after being lifted by the highest point of the cam 189, part of the cam being circular to keep the lifting-plate in a steady position while the ejector is moving forward and then dropping below the plate 70, as seen in Figs. 64 and 65, the dropping of the plate 196 not taking place until the front face of the ejector 204, whereon the guard 205 is fastened, is on a line with the front end of the plate 70, when the plate 196 drops suddenly.

Fig. 68 represents a side view of the splint-cutting machine directly opposite the view shown in Fig. 4. In this view is shown the main shaft 2, the method of driving the ejector, the cam 14 for clamping or pressing the splints in the splint-holding plates by means of the fingers, Figs. 5, 30, 31, 48, 54, and 55, the cam 26, which operates the concave-face evener, Figs. 30, 32, and 33, the bevel-gears 28 and 29, which operate the lifting-plate 196, Fig. 63, and the drum on which rotates the link chain, Figs. 56 and 59.

Fig. 69 represents a side view, Fig. 5, of the stand or bearing for the shafts which drive the self-locking cam 175, Figs. 39, 40, 5, and 7. It will be seen that the cam makes but one revolution while the driving-shaft makes two.

Fig. 70 represents a plan view of the parts seen in Fig. 69, showing the two bearings for the short shaft, which is mounted on the spur and bevel gears, and the one bearing for the driving-shaft, the other bearing being seen in Figs. 76 and 77.

Fig. 71 represents a perspective view of the bearing or stand seen in Figs. 69 and 70 and shows the method of fastening to the top of the splint-cutting-machine frame.

Fig. 72 represents a face view of the pivoted arm, having a roller pivoted at its upper end to keep in contact with the cam 14, and to which is connected the link 74, which causes the movement of the clamping-fingers. (Seen in Figs. 48, 54, 55, 31, 35, 36, and 5.)

Fig. 73 represents a face view of the pivoted arm, at the upper end of which is pivoted a roller to keep in contact with the cam 26. At the other end is pivoted the link 183, which operates the concave-face evener. (Seen in Figs. 30, 32, and 33.) It will be noted that the cams 14 and 26 are similar in construction or outline; but the cam 26 is so placed to operate the evener 181 just an instant previous to the clamping action of the finger. (Seen in Figs. 31, 35, 48, 54, and 55.) This is to allow the splints to assume the contour of the evener, which is a circle or radius in which the circular conveyer rotates. It will be also noted that the arm 15 is pivoted at the lower end, while the arm 27 is pivoted at its center.

Fig. 74 represents a plan view of the brackets or bearings of the shaft, on which are fastened the arms 191 and 193, as seen in Figs. 63, 64, and 65.

Fig. 75 represents a perspective view of part of the splint-cutting-machine frame, showing the ejector 204 in proper position (the guards shown in Figs. 66 and 67 removed) to eject the matches on the chain, as seen in Fig. 56. In this view the ejector is shown at its slowest speed, this being to merely sweep or push the matches from the plate 70 to the chain 212 after being loosened by the lifting-plate. It is plain to be seen that if any speed at all be given to the ejector it would cause the matches to be knocked from the plate 70 and fly in all directions. The ejector in the position shown is at its slowest speed, and after pushing out matches the speed accelerates until it arrives at a point opposite that shown, after which it moves slower and slower until again in the original position, the ratio of speed between the slow and fast speed being about four to one.

Fig. 76 represents a side view of the mechanism for causing the variable motion of the ejector. On the main shaft 2 is fastened a gear 11, which meshes with gear 12, gear 12 being mounted on the shaft 13, rotating in suitable bearings. On shaft 13 is fastened an eccentric gear 16, which meshes with another eccentric gear 17. Loosely mounted on shaft 18, secured to eccentric gear 17, is the bevel-gear 198, which meshes with bevel-gear 199, which is fastened to shaft 200, which rotates the ejector, as seen in Fig. 75. It is noticed that instead of the bevel-gear 198 being fastened to the eccentric gear 17 the said gears 198 and 17 may be fastened to the shaft 18 in the usual manner by means of a chain. Shaft 13 also drives shaft 36, which has a cam or wiper on one end which moves the dog or pawl which feeds the wood to the splint-cutters. (See Figs. 2, 5, 7, and 77.)

Fig. 77 represents a plan view of the parts seen in Fig. 76.

Fig. 78 represents an enlarged end view of a block of wood, showing the splint-cutters in the act of entering the wood at the bottom. It will be noticed that the cutters are separated a distance apart equal to one-half of the thickness of the splint—i. e., if the splints are one-eighth ($\frac{1}{8}$) of an inch thick the cutters are spaced apart one-sixteenth ($\frac{1}{16}$) of an inch—and it will also be noticed that a tongue of wood extends down in between the arched top of the cutters a distance equal to one-half the thickness of the splint.

Fig. 79 represents a part of a block after the cutters have cut a row of splints therefrom.

Fig. 80 represents a view of the block seen in Fig. 78 after said block has been moved sidewise by self-locking cam 176 (see Figs. 3, 9, and 40) and also downward. The distance moved sidewise is sufficient to bring the center of the tongue of wood, which extends down between the tops of the arches of the cutters, directly in the center of the hole in the cutter, as shown in Fig. 80, the movement of the cam 176 bringing the block back to its original plate. It will be noticed that the downward movement of the block 53 is only one-half the thickness of the splint.

Fig. 81 represents a view of the block 53 moved downward, but previous to being moved sidewise. (See direction of arrows.)

I have shown in these views that the downward movement takes place previous to the side movement. It can be reversed—i. e., the side movement first and the downward movement last.

Fig. 82 represents the splints placed back in the block from which they were cut.

Fig. 83 represents a partial side view of the cross-head and cutter-block, Fig. 44, in position. In this view is shown a cutter in dotted lines, the bars 60, which hold the same, set-screw 61 for clamping the same; also, the knife 80, (see Figs. 30, 34, and 38,) which extends back to the splint-cutters, Figs. 86 and 87, and is for the purpose of shearing any excess of wood which may from any cause extend down too far.

Fig. 84 represents a partial plan view of the cutter-block 57, showing cutters in place held by the bars 60, which are clamped by screws 61. It will be noticed that one bar clamps two cutters at one time, the grooves in which are placed the cutters being also shown.

Fig. 85 represents a front view of the cutter-block, with the set-screws 61, bars 60, and the plate through which the set-screws go removed. The cutters 58 are shown in proper grooves and are set to a height so as to bring the hole in cutter 58 on a level with the scalloped back, as shown, some of the cutters being removed for clearness of illustration.

Fig. 86 represents a back view of a cutter employed.

Fig. 87 represents a side view thereof.

Fig. 88 represents an enlarged perspective view of a finished splint, single length.

Fig. 89 represents a side view of the link chain seen in Figs. 56, 59, 60, and 1, the drum 213 being loosely mounted on a shaft secured to suitable brackets securely fastened to the frame of the drying-aprons. (See Figs. 1 and 2.) It also shows a belt under the upper links to support the weight of the links. At the end where the links run around the drum 213 is a belt 223, which being held against the chain 212 prevents the matches from falling from the chain 212 in running around said drum 213 and to the point C. It is plainly evident that the matches would fall from the under side of the chain 212 but for said belt 223. By this means I secure almost double the drying distance which I would secure if the chain 212 would discharge the matches at the drum 213. Practical match-makers know that if the weather is dry it will absorb the moisture of the composition very quickly; but if the weather is damp and full of moisture it takes a longer time to dry matches, and if the heads of matches are allowed to come in contact with one another in damp weather when not sufficiently dry they "sweat" together and form one coagulated mass, which of course is not salable. The belt 215, which drives the drying-aprons, is also seen.

Fig. 90 represents a front view of the bracket which supports the rollers around which rotate the belts seen in Fig. 89, the belt 221 receiving the matches at C and discharging them upon the apron 224, which is the first of a series, as seen in Fig. 95.

Fig. 91 represents a plan view, on a small scale, of the back or sliding surface of the circular conveyer, showing the ratchet-blocks, Fig. 94, in place.

Fig. 92 represents a partial vertical section of the circular conveyer and the spider upon which it rotates, the spider being securely fastened to the hollow frame 1. (Seen in Figs. 1, 2, and 4.)

Fig. 93 represents a plan view, on a small scale, of the spider seen in Fig. 92.

Fig. 94 represents a perspective view of the ratchet-block, which is secured to the under side of the circular conveyer. (Seen in Figs. 8, 91, and 92.)

Fig. 95 represents a side view of the drying-aprons, showing the elevator-belt 226, which carries the matches from the bottom of this series of aprons to the top of the next series.

Fig. 96 represents a side view of the next series of aprons. It will be noticed that the first series receive the matches at the end nearest to the machine, while the second series receive them at the other end.

Fig. 97 represents a partial plan view of the mechanism for causing the matches to discharge at the bottom of the various aprons onto the elevator-belts.

Fig. 98 represents an enlarged view of a portion of the elevator-belt 226 as seen in Fig. 95. In this view is shown the top or discharge end.

Fig. 99 represents a perspective view, on an enlarged scale, with one side partly broken, of the pockets which are riveted to the elevator-belt 226, as seen in Figs. 95, 97, and 98.

Fig. 100 represents a partial plan view of the drying-aprons, showing the discharge end of the elevator-belts which discharge the matches on the cross-aprons 227 228 and which in turn discharge same on the next series of aprons. It also shows the apron 221, which receives the matches as discharged at C, Fig. 89, and discharges them upon the first series of aprons.

Fig. 101 represents an end view showing method of driving the cross-aprons 227 and 228.

Fig. 102 represents an end view showing the method of driving the cross-aprons 225 225$^a$ 225$^b$. (See also Figs. 95 and 97.)

Fig. 103 represents a side view showing the method of driving the cross-belts 227 228, as seen in Fig. 101.

Similar characters of reference indicate corresponding parts in the figures.

Referring to the drawings, 1 designates the frame of the machine, and 2 designates the main driving-shaft journaled therein and driven in any suitable manner—in the present instance by the pulley 3, around which may be passed a belt in the usual manner. The shaft 2 is provided with crank-arms 4, (see more particularly Figs. 4, 5, and 7,) it being noted that said crank-arms 4 have pivotally connected therewith one end of a pitman 5, whose opposite end is pivotally connected, as at 6$^a$, (see Fig. 5,) to a cross-head or block 6, which is adapted to be moved to and fro in suitable guides or ways in the frame 1 for a purpose to be hereinafter described. The shaft 2 is also provided with a crank-arm 7, which is adapted to operate a pitman 8, so that the latter may transmit a reciprocating motion to a cross-head or block 9, guided in ways 10 in the frame 1 and for a purpose to be hereinafter described. It will be noted on referring to Fig. 5 that the pitmen 5 and 8 are screw-threaded, so as to permit the strokes of the cross-heads 6 and 9 to be adjusted according to requirements. The shaft 2 is also provided with a spur-wheel 11, which meshes with a gear-wheel 12, secured to the shaft 13, which latter is journaled in the frame 1. The shaft 2 is also provided with a cam 14, which is adapted to operate a lever 15 for a purpose to be hereinafter described. (See Figs. 4, 5, 68, and 72.) The shaft 13 is provided with a spur-gear 16, which is eccentrically mounted thereon and meshes with a gear-wheel 17, eccentrically mounted on the shaft 18, as best seen in Figs. 5, 7, and 77. The shaft 13 is also provided with a sprocket-wheel 19 and a pinion 20, the object of both of which will be hereinafter described. The gear-wheel 11 meshes also with an idler 21, which latter transmits motion to the gear-wheel 22, mounted on the shaft 23, it being noted that said gear-wheel 22 meshes with the gear-wheel 24, mounted on the shaft 25. The shaft 23 is provided with the cam 26, adapted to operate the lever 27 for a purpose to be hereinafter described. The shaft 25 is provided with the bevel gear-wheel 28, which meshes with a gear-wheel 29 on the shaft 30. The shaft 25 is also provided with a bevel gear-wheel 31, which meshes with a bevel-gear 32, mounted on the shaft 33, the object of all of which will be hereinafter described.

The sprocket-wheel 19 imparts motion to a chain 34, which transmits motion to a sprocket-wheel 35, mounted on a shaft 36, so as to rotate a cam 37, secured to said shaft 36, it being noted that the cam 37 is adapted to impart motion to a lever 38, fulcrumed in the frame 1, (see more particularly Fig. 5,) said lever 38 having connected therewith a dog 39, which engages the teeth of a ratchet-wheel 40, so as to rotate the same. The ratchet-wheel 40 is secured to the shaft 41, which has mounted thereon the pinion 42, which meshes with the gear-wheel 43, secured to the shaft 44, which is provided with the feed-roller 45, it being noted that the gear-wheel 43 meshes with the gear-wheel 46, secured to the shaft 47, and that the latter has mounted thereon the feed-roller 48, the object of all of which will be hereinafter described. The lever 38 is held against the cam 37 by a spring 49, which bears against the member 50 of the lever 38, as best seen in Fig. 5, it being noted that the pressure of said spring can be regulated by the nut 51.

Secured to the frame 1, adjacent to the feed-rollers 45 and 48, is a hopper 52, into which are placed the blocks 53 of wood and from which the splints 54 are cut, it being noted that said blocks 53 pass between the feed-rollers 45 and 48 and that the lowermost blocks are prevented from dropping from the hopper 52 by the clamps 55, which are caused to bear against said blocks by the springs 56, as best seen in Figs. 38, 39, and 42.

The block or cross-head 6 has secured thereto the block 57, (see more particularly Figs. 43, 44, and 45,) it being noted that said block 57 has secured therein the cutters 58, (see also Figs. 83, 84, and 85,) which sever the splints 54 from the blocks 53. It is to be noted that each cutter 58 is separate and distinct from the others, so that in case one of these should break it should be removed from its position in the block 57 without disturbing the other cutters, it being evident that when two or more cutters form part of the same piece of metal should one of these break the others then become useless.

The block 57 is provided with grooves 59, into which the cutters 58 are placed, as seen in Figs. 84 and 85, after which the bars 60 are placed against said cutters, and the bolts 61 are tightened against said bars, so as to cause the latter to bear firmly against the cutters 58 and retain them in their adjusted positions in the block 57, after which said block is secured to the cross-head 6 by means of the bolts 62 and 63, it being noted that when the nut 64 is tightened against the under side of the block 57 it exerts a downward pull on the bolt 62, and thereby causes the flaring portion 65 of its head 66 to draw the block 57 firmly against the cross-head 6, and thus secure said block and cross-head together, so that when a reciprocating motion is imparted to the cross-head 6 the cutters 58 will move in unison therewith.

Pivoted to the frame 1, as at 67, is a frame 68, which latter has secured thereto the clamps 69, (see more particularly Figs. 31, 34, 35, and 54,) which are adapted to bear at certain times against the rear portion of the splints 54, so as to retain the latter firmly in position within the conveyer-plates 70 for a purpose to be hereinafter described. The frame 68 has pivoted thereto one end of a link 71, it being noted that the opposite end of said link is pivoted to an arm 72, which is secured to a rock-shaft 73, to which latter motion is imparted by the cam 14, lever 15, link 74, and the arm 75, as best seen in Fig. 5. The link 74 is screw-threaded, so as to permit the throw of the arms 72 and 75 to be adjusted in order to regulate the pressure of the clamps 69 against the splints 54 in the conveyer-plates 70 for a purpose to be hereinafter described.

The pivoted frame 68 has secured thereto the fingers 76 and 77, located alternately relatively to each other, (see Figs. 4, 31, 34, 48, and 55,) which are adapted to bear at certain times against the splints 54 in the conveyer-plates 70, so as to force said splints firmly within the grooves 78 and 79 in the plates 70, so as to separate the ends of said splints sufficiently to prevent any possibility of "double heads" being formed, (see more particularly Figs. 48, 49, 51, 52, 53, and 55,) it being noted that the grooves 78 are of uniform depth throughout their entire length and that the grooves 79 are deeper at their outer extremities than at their inner ones, as best seen in Fig. 55, and that the portions of the fingers 77 which are brought in contact with the splints 54 have a slant which coincides with that of the grooves 79. It is to be further noted on referring to Fig. 48 that the portions of the fingers 76 which are brought in contact with the splints 54 are parallel with the base portion of the grooves 78, the object of all of which will be hereinafter described.

The cross-head 57 is provided with a knife 80, located in front of the cutters 58 and adapted to trim the under side of the blocks 53 should the latter from any cause be moved downward a distance greater than is necessary, it being apparent that the knife 80 removes such portions of the blocks 53 as may lie in its path, and thereby insures the production of splints of uniform size.

The conveyer-plates 70 are secured to a frame 81, (see more particularly Figs. 91, 92, and 93,) said frame having secured thereto the plates 82, provided with depressions 83, (see Figs. 8 and 94,) adapted to be engaged by the dog 84, so that a rotary motion may be imparted to the frame 81, and consequently to the conveyer-plates 70, secured thereto. The frame or conveyer 81 is provided with an opening 85, (see more particularly Figs. 91 and 92,) which receives the stud-shaft 86 on the spider 87, the latter being firmly secured to the frame 1 of the machine, it being apparent that when rotary motion is imparted to the frame 81 the latter will be guided and supported on the spider 87.

The dog 84 is pivoted to a bell-crank lever 88, which latter is pivoted to the frame 1, as at 89, (see more particularly Fig. 7,) it being noted that the bell-crank lever 88 is operated by the link 90, cross-head 9, pitman 8, and crank-arm 7. The tooth of the dog 84 is caused to enter the depressions 83 by the pressure of the spring 91.

The splints 54 are caused to pass between the pipes 92, 93, and 94, (see Figs. 1, 2, 3, 13, and 21,) it being understood that all of said pipes may be supported in any suitable manner—for instance, by brackets and clamps 95 and 96, respectively, as seen in Fig. 21. The pipe 94 is coupled to a coil of pipe 97, located within a hopper 98, (see Fig. 17,) said coil of pipe 97 communicating with a coil consisting of the pipes 99, 100, and 101. (See more particularly Figs. 1 and 3.) The pipe 101 communicates with the pipe 102, which latter passes through a reservoir 103, in which is placed the wax, which when in a liquid state is applied to the splints 54 and is absorbed by the same. The pipe 102 is provided with a valve 104 for evident purposes. The pipe 101 also communicates with a pipe 105, which leads into a chamber 106, (see more particularly Fig. 28,) which surrounds the hopper 107, in which latter is placed the composition for the heads 108 of the matches, it being noted that said pipe 105 is provided with a valve 109 for evident purposes. The hopper 107 is located within a casing 107ª, it being noted that the space between the walls of said casing and the walls of the hopper 107 forms the chamber 106.

The reservoir 103 has a pipe 110 leading therefrom into the hopper 98, (see Figs. 10 and 11,) it being noted that said pipe 110 is provided with a float-valve 111, which closes automatically the communication between the reservoir 103 and the hopper 98 when the level of the melted wax in said hopper is at a predetermined height therein and opens automatically the communication between the reservoir 103 and the hopper 98 when the level of the melted wax in said hopper is below a predetermined height therein, it being apparent that said float-valve 111 causes the melted wax in the hopper 98 to maintain an approximately constant level.

Pivoted to the frame 1, as at 112, (see more particularly Figs. 9 and 10,) is a frame 113, having journaled therein a roller 114, which rests upon a cam 115, secured to the shaft 115ª, journaled in the frame 1. (See Figs. 3, 9, 10, and 11.)

The shaft 33 has secured thereto the bevel gear-wheel 116, which meshes with the bevel gear-wheel 117, secured to the shaft 118, (see more particularly Fig. 4,) it being noted that said shaft 118 has also secured thereto the bevel gear-wheel 119, which meshes with the bevel gear-wheel 120, secured to the shaft 121, which latter has secured thereto the bevel gear-wheel 122, which meshes with the bevel gear-wheel 123, secured to the shaft 124, which latter has also secured thereto the bevel gear-wheels 125 and 126. (See Figs. 1 and 3.) The bevel gear-wheel 125 meshes with a bevel gear-wheel 127, secured to the shaft 128, which has also secured thereto the bevel gear-wheel 129, which meshes with the bevel gear-wheel 130, secured to the shaft 131, which latter has secured thereto the bevel gear-wheel 132, which meshes with the bevel gear-wheel 133, as best seen in Figs. 3 and 11. The bevel gear-wheel 133 is secured to the shaft 115ª, to which latter is also secured the pulley 134, around which passes the belt 135, it being noted that said belt 135 passes also around the pulley 136, secured to the shaft 137, so as to impart motion to the pump 138, the object of which will be hereinafter described.

The hopper 98 (see Figs. 9, 10, and 11) is provided with a pipe 139, which directs the melted wax from said hopper 98 into the pump 138, which latter forces the melted wax up the pipe 140 and is discharged from the latter into the trough 141 and into which certain portions of the splints 54 are introduced, so as to be saturated with wax, it being noted that the melted wax in flowing down the trough 141 is discharged into the hopper 142, and from thence through the pipe 143 back into the hopper 98. The coil 97 within the hopper 98 is connected to the pipes 94 and 99 by the unions 144, (see Figs. 3 and 17,) so that said hopper 98 may be readily connected with said pipes or be disconnected therefrom when so desired.

The bevel gear-wheel 125 meshes with a bevel gear-wheel 145, (see Fig. 29,) secured to the shaft 146, which latter has secured thereto the cam 147, (see Figs. 26, 27, and 29,) it being noted that said cam 147 has resting thereon a roller 148, journaled in the link 149, to which latter is pivoted, as at 150, the frame 151, said frame 151 being also pivoted at 152 to the casing 107ᵃ.

Journaled in the frame 151 is the shaft 153, (see Figs. 26 to 29, inclusive,) said shaft having secured thereto the roller 154, which lies partly within the hopper 107, so as to come in contact with the composition 155, placed within said hopper, as best seen in Figs. 27 and 28.

The frame 151 has secured thereto the scrapers 156 and 157, (see Figs. 27 and 29,) it being noted that the scrapers 156 remove from the sides of the roller 154 the composition 155, which would otherwise adhere thereto, and that the scraper 157 may be brought nearer to or farther from the roller 154, so that the thickness of the composition 155, which adheres to the periphery of said roller 154, may be increased or decreased, as may be required, so that the proper quantity of composition 155 may be applied to the splints 54, and thus produce the heads 108 thereon of a proper size.

The shaft 153 has secured thereto the rollers 158, which normally rest upon the rollers 159, which latter in the present instance are two in number and have secured thereto their respective gear-wheel 160. The gear-wheels 160 mesh with gear-wheels 161, secured to the shaft 162, which has also secured thereto the bevel gear-wheel 163, which meshes with the bevel gear-wheel 126, it being noted that the shaft 162 is journaled in stuffing-boxes 164 and 165 in the casing 107ᵃ and hopper 107, respectively, thereby preventing leakage of the contents of both the hopper 107 and the chamber 106. (See more particularly Fig. 28.) The shaft 153 is prevented from rotating when removed from contact with the rollers 159 by the shoe 166, which is caused to bear against said shaft 53 by the spring 167, as best seen in Figs. 27 and 29. The shaft 162 has secured thereto a paddle or beater 167ᵃ, which thoroughly mixes the composition 155 when the machine is in operation.

Secured to the frame 1 of the machine by clamps 168 is a pipe 169, provided with openings 170, (see Figs. 1, 2, 3, and 22 to 25, inclusive,) through which openings the air forced through said pipe 169 by the blower 171 impinges against the heads 108 of the matches and causes said heads to set or become hardened. The blower 171 may be driven in any suitable manner.

The gear-wheel 20 meshes with a gear-wheel 172, which has secured thereto a bevel gear-wheel 173, which latter meshes with a bevel gear-wheel 174, secured to the shaft 175, it being noted that said shaft 175 has also secured thereto the cam 176, which imparts a lateral motion to and fro to the sliding frame 177, to which is secured the hopper 52, as best seen in Figs. 1, 2, 4, 5, 7, 37, 39, and 40. (See, also, Figs. 69 and 70.) The frame 177 is guided in ways 178 in the frame 1 of the machine, and the cam 176 is journaled in the standards 179. (Seen in Fig. 41.) The ways 178 are provided with gibs 230. (See Fig. 5.)

Pivoted to the frame 1, as at 180, (see more particularly Fig. 30,) is a plate 181, whose upper portion is provided with the concave face 182, which is brought at certain times against the outer ends of the splints 54, so as to cause the latter to be moved from the straight line seen in Fig. 32 to the curved one seen in Fig. 33, it being understood that the curvature of the concave face 182 corresponds to an arc of a circle whose center coincides with that of the frame 81, it being apparent that when the splints 54 are thus placed in the conveyer-plates 70 they will all be at an equal distance above the roller 154 when the latter is applying the composition 155 to the splints 54, so as to form the heads 108 thereon, it being noted on referring to Figs. 1 and 28 that the periphery of said roller 154 is concave and that the splints after having been adjusted by the plate 181 are so placed in the conveyer-plates 70 that the heads 108 will all be approximately of equal size.

The lever 27 (see Figs. 5 and 7) has pivoted thereto one end of a rod 183, the opposite end of which is pivoted to a lever 184, secured to the shaft 185, journaled in the frame 1, it being noted that said shaft 185 has also secured thereto the lever 186, which latter has pivoted thereto one end of the stem 187, (see Figs. 7, 30, 32, and 33,) it being noted that said stem 187 bears against the plate 181 and that the latter is kept in contact with said stem by the spring 188. The end portions of the rod 183 are screw-threaded, so as to permit the throw of the plate 181 to be increased or decreased, according to requirements.

The shaft 30 has secured thereto the cam 189, (see more particularly Figs. 63, 64, and 65,) upon which rests a roller 190, journaled in an arm 191, secured to a shaft 192, which latter has secured thereto the arm 193, to which is pivotally secured the adjustable rod 194, it being noted that said rod 194 is also pivoted to the slide 195, which has secured thereto the plate 196 and is guided in the ways 197, secured to the spider 87.

The gear-wheel 17 has secured thereto the bevel gear-wheel 198, which meshes with a bevel gear-wheel 199, secured to the shaft 200, it being noted that said shaft 200 has also secured thereto the bevel gear-wheel 201, which meshes with the bevel gear-wheel 202, secured to the shaft 203, which latter has secured thereto the ejector 204, which is provided with the plate or finger 205, (seen in Figs. 66 and 67,) which is substantially the same width as the ejector 204.

The cam 189 has pivoted thereto one end of the rod 206, (see more particularly Figs. 58 to 62, inclusive,) it being noted that the opposite end of said rod is pivoted to the arm 207, which is loosely mounted on the shaft 208, it being further noted that said arm 207 is provided with the dog 209, which engages with the teeth of the ratchet-wheel 210, loosely mounted on the shaft 208, and on referring to Fig. 59 it will be seen that said ratchet-wheel 210 is secured to the sprocket-wheel 211, so as to turn in unison with said ratchet-wheel 210. The sprocket-wheel 211 imparts motion to the conveyer 212, which latter passes also around the sprocket-wheel 213. (See more particularly Figs. 1, 2, 59, 60, and 89.)

The shaft 30 has secured thereto the pulley 214, around which passes the belt 215, which passes also around the pulley 216, so as to impart motion to the shaft 217, to which latter is secured the pulley 218, around which passes the belt 219, which transmits motion to the pulley 220, and consequently to the endless apron 221.

Journaled in the frame of the machine are rollers 222, (see Fig. 89,) around which is passed the endless apron 223, which prevents the matches from leaving the conveyer 212, when said matches are on the under side of the conveyer, until they reach the point $e$, when being no longer supported by said apron 223 they drop from the grooves in the conveyer 212 and fall upon the endless apron 221, which conveys them to the endless apron 224, adjacent thereto, and which latter is the uppermost one of a series of endless aprons, as best seen in Fig. 95.

When the matches are discharged from the lowermost apron 224 of the series above referred to, they drop upon the apron 225 (see right-hand portion of Fig. 97) and are directed thereby to the conveyer 226, (see also Figs. 95 and 102,) which conveys them to the apron 227, which latter directs them to the uppermost apron $224^a$, it being noted that the lowermost apron $224^a$ discharges the matches thereon upon the apron $225^a$, which latter directs them to the conveyer $226^a$, which in turn discharges the matches thereon upon the apron 228, which latter directs them to the uppermost apron $224^b$ of a series of aprons, it being noted that the lowermost apron $224^b$ discharges the matches thereon upon the apron $225^b$, which in turn directs them to the conveyer $226^b$, from which said matches may be discharged into a suitable receptacle.

Referring to Fig. 95, the shaft 217 has secured thereto the pulley 229, around which is passed the belt 230, which drives the pulleys 231, so as to impart motion to the aprons 224. The apron 225 is driven by the belt 232, to which latter motion is imparted by the pulley 233, secured to the shaft 217, as best seen in Figs. 95, 100, and 102. The conveyer 226 is driven by the belt 230. (Seen in Fig. 5.)

The apron 227 is driven by the belt 234, (see Figs. 95 and 100,) which is passed around the pulley 235, secured to the shaft 217, and also around the pulley 236, secured to the shaft 237, to which latter is also secured the pulley 238, around which is passed the belt 239. (See also Fig. 103.) The shaft 237 has secured thereto the pulley 240, around which is passed the belt 241, (see Fig. 95,) which assists the belt 230 in imparting motion to the aprons 224. The aprons $225^a$ and $225^b$ are driven by the belts 242, as best seen in Fig. 102. The apron 228 is driven by the belt 243. (See Fig. 100.) The aprons $224^a$ are driven by the belts 244 and 245, as best seen in Fig. 96. As the manner of driving the apron $224^b$ is similar to that employed in driving the apron $224^a$, a description of the same is deemed unnecessary.

The conveyers 226, $226^a$, and $226^b$ are provided with pockets 246, as best seen in Figs. 95, 98, and 99. The conveyer $226^a$ is driven by a belt which is passed around the pulley 247 (see Fig. 100) on the shaft 217, and the conveyer $226^b$ is driven by a belt which is passed around the pulley 248 on the shaft 217.

The operation is as follows: Blocks 53, from which splints 54 are cut, are placed within the hopper 52, and when motion is imparted to the main driving-shaft 2 the latter will impart an intermittent rotary motion to the feed-rollers 45 and 48, by means of the gear-wheels 11 and 12, sprocket-chain 34, the cam 37, the ratchet-wheel 40, the lever 38, the dog 39, and gear-wheels 42, 43, and 46, it being apparent that said feed-rollers 45 and 48 cause the blocks 53 to move downward, so as to be brought in the path of the cutters 58. Assuming the cutters 58 and the knife 80 to be in the positions seen in Fig. 5, it will be apparent that when said cutters and knife are moved from left to right by means of the crank-arms 4, the rod 5, and cross-head 6 said knife 80 will remove such portion of a block 53, if such exists, as may be below the proper point for the cutters 58, thereby leaving the under side of a block 53 in the proper position for said cutters. The cutters 58 in moving from left to right cut the splints 54 and retain them therein by reason of the friction between the inner walls of the cutters and the portion of the splints 54 in contact therewith, it being apparent that only a small portion of each splint 54 remains in its respective cutter 58 and that the greater portion of a splint projects beyond a cutter, as best seen in Fig. 54. When the cutters 58 have completed their stroke from left to right, they have cut a series of splints 54 from a block 53, after which said cutters are moved from right to left by the mechanism hereinbefore described and bring the splints 54, that project therefrom, into the position seen in Figs. 7, 30, and 54, it being noted that certain portions of said splints are caused to enter the grooves 78 and 79 in a conveyer-plate 70, after which the clamps 69 are brought in contact with said splints by means of the cam 14, the lever 15, the rod 74, the arms 72 and 75, the rod 71, and the pivoted frame 68. The clamps 69 when brought in contact with the splints 54 exert a pressure thereon and prevent the cutters 58 from carrying with them the splints, when said cutters are again moved from left to right in order to cut a subsequent series of splints 54. After the splints 54 have been removed from the cutters 58 the clamps 69 are returned to their normal positions by the mechanism hereinbefore described and again occupy positions similar to those seen in Fig. 54, after which the frame 81 has a partial rotation imparted thereto by the crank-arm 7, the rod 8, cross-head 9, link 90, bell-crank lever 88, and dog 84. (See more particularly Figs. 5, 7, and 8.) The extent of each intermittent motion imparted to the frame 81 corresponds to the distance from $c$ to $d$ in Fig. 7. When a conveyer-plate 70 has been moved from $d$ to $e$ in Fig. 7, the splints 54 therein are brought in the path of the plate 181 and its curved face 182 impinges against the outer ends of said splints and causes the latter to assume a curve relatively to each other corresponding to the curved face 182 of the plate 181, as best seen in Fig. 33, it being apparent that the outer ends of the splints after being adjusted by the plate 181 will be equidistant from the center of the frame 81, so as to coincide with the concave periphery of the roller 154, as best seen in Fig. 28, so that when the composition 155 is applied to the ends of the splints 54 to form the heads 108 thereon said heads will be of uniform size. After the splints 54 have assumed their curvilinear positions in the conveyer-plates 70 the fingers 76 and 77 (see Figs. 48 and 55) are brought in contact with the splints in alinement therewith by the pivoted frame 68, to which they are secured and to which latter motion is imparted, as hereinbefore described. The fingers 76 force certain of the splints 54 firmly within the grooves 78, and the fingers 77 force certain of the splints 54 firmly within the grooves 79, so that when said fingers 76 and 77 have forced their respective splints 54 into the grooves 78 and 79 said splints will assume the positions relatively to each other seen in Figs. 52 and 53, it being noted that the ends of the splints to which the heads 108 are applied are sufficiently separated from each other to prevent the formation of "double heads." The intermittent motions imparted to the frame 81 will cause portions of the splints 54 to pass between the heated pipes 92, 93, and 94, (see Figs. 1, 2, 13, and 21,) it being apparent that the heat from said pipes will thoroughly dry the splints, so that the latter will be in a proper condition to receive the melted wax. The melted wax within the hopper 98 flows into the pump 138 by gravity, (see Figs. 9, 10, and 11,) and said pump 138 forces the wax therein through the pipe 140 into the trough 141 and flows down the latter and discharges into the hopper 142. When a series of splints 54 is brought in alinement with the trough 141 by its conveyer-plate 70, as seen in Fig. 10, the trough 141 is elevated so as to cause the wax flowing therethrough to come in contact with said splints 54 and thoroughly saturate the same, it being noted that the trough 141 is brought in contact with the splints 54 by the cam 115, to which latter motion is imparted by the gear-wheels 11 21 22 24, bevel gear-wheels 31, 32, 116, 117, 119, 120, 122, 123, 125, 127, 129, 130, 132, and 133. (See Figs. 1, 3, 5, and 11.) After the splints 54 have had melted wax applied thereto they are caused to pass between the pipes 99, 100, and 101, the heat from said pipes causing the wax previously applied to the splints 54 to remain in a liquid condition, so as to thoroughly soak into said splints before the latter are brought in alinement with the roller 154. The splints 54 when brought by their respective conveyer-plates 70 to a position directly above the roller 154 have the composition 155 applied to the outer ends thereof by the roller 154, which latter is elevated by the cam 147, (see Figs. 26, 27, and 29,) it being noted that when said roller 154 is in an elevated position, as seen in Fig. 27, the rollers 158 are removed from contact with the rollers 159, so that said roller 154 does not rotate when applying the composition 155 to the splints 54. Motion is imparted to the cam 147 by the bevel gear-wheels 125 and 145, it being noted that said bevel gear-wheel 125 is driven from the main driving-shaft 2, as hereinbefore described, in connection with the mechanism employed for waxing the splints. (See more particularly Fig. 29.) Motion is imparted to the roller 154 by the bevel gear-wheels 126 and 163, the spur-gears 161, which mesh with the gear-wheels 160, and the friction-rollers 159 and 158, as best seen in Fig. 28. After the heads 108 have been applied to the splints 54 the former are caused to pass sufficiently close to the pipe 169 so that the air forced through the openings 170 therein by the fan 171 is brought in contact with said heads and causes the latter to become "set" or hardened before they reach the ejector 204. It will be apparent that the splints 54 after being inserted in the conveyer-plates 70 are carried step by step by the intermittent motion imparted to the frame 81 to the point where they are removed from said conveyer-plates by the ejector 204. The splints 54, with heads 108 thereon, are brought by the frame 81 in the path of the plate 196, (see Fig. 63,) so that said plate in being elevated by the cam 189 will be brought in contact with the splints 54 and loosen them from their firm position within the grooves 78 and 79 by slightly lifting them from their normal positions in said conveyer-plates 70, as seen in Figs. 52 and 53, to that seen in Fig. 66. When the matches, consisting of the splints 54 and heads 108, are in the position seen in Fig. 66, the ejector 204 in rotating on its axis 203 (see Fig. 75) will remove the matches from the conveyer-plates 70 (see also Fig. 67) and will cause said matches to fall upon the conveyer 212 (see Figs. 1, 2, 7, 56, and 89) and are carried thereby to the point e in Fig. 89, from which point said matches are discharged upon the apron 221, which latter directs them to the uppermost apron 224. (See also Fig. 95.) The ejector moves slower toward the matches than after leaving them. When the matches have been passed downward from the uppermost apron 224 to the lowermost one of this series, they are discharged upon the apron 225. (See Fig. 97.)

It will be noted that the apron 225 discharges the matches thereon upon the conveyer 226, (see more particularly Fig. 95,) said conveyer 226 elevating the matches deposited thereon to a point above the apron 227, so as to readily discharge the matches upon said apron 227, which latter directs them to the uppermost apron 224$^a$, from which they are carried downward by the several aprons in this series of aprons until the lowermost one discharged them upon the apron 225$^a$, (see Fig. 97,) which latter directs them to the conveyer 226$^a$, which elevates them to a point above the apron 228, so as to readily discharge them upon the latter, which directs them to the uppermost apron 224$^b$ and downward throughout this series to the apron 225$^b$, which directs them to the conveyer 226$^b$, which elevates them to a point from which they may be discharged into a receptacle of any suitable description.

The chamber 106 (seen in Fig. 28) may be supplied with steam by the pipe 101, so as to keep the composition 155 within the hopper 107 at the proper consistency. It is to be understood that said chamber 106 is provided with suitable outlet-pipes for the steam and water contained therein, so that said chamber 106 may be relieved therefrom when so desired and also permit the free circulation of steam in said chamber, and it is to be noted on referring to Fig. 3 that the pipes which project from the casing 107$^a$ are provided with unions 107$^b$, so that said casing may be readily connected to or disconnected from the inlet-pipe 107$^a$ and outlet-pipe 107$^c$ when so desired.

Referring to Figs. 78 to 82, inclusive, assuming that a series of splints 54 are being cut from the block 53, (seen in Fig. 78,) it will be apparent that said block 53 and cutters 58 will be in the positions relatively to each other seen in said figure, and after said splints 54 have been cut the under side of the block 53 is left in the condition seen in Fig. 79, and when the cutters 58 have been removed from the path of said block 53 the latter is lowered by the feed-rollers 45 and 48 a sufficient distance to furnish the required depth of material for a subsequent series of splints 54, the distance that said block is lowered being indicated at $h$ in Fig. 81, after which the frame 177 and consequently the block 53 are moved laterally by the cam 176 from left to right, (see also Fig. 40,) whereupon said block 53 will occupy the position relatively to the cutters 58 seen in Fig. 80. The extent of lateral movement imparted to the block 53 is indicated at $j$ in said Fig. 80. After the series of splints 54 (seen in Fig. 80) have been cut and the cutters 58 are removed from the path of the block 53, the latter is again lowered by the feed-rollers 45 and 48 a distance equal to that indicated at $h$ in Fig. 81, after which the frame 177 and consequently the block 53 are moved from right to left by the cam 176, as seen in Fig. 39, and the block 53 is again in a position to have another series of splints 54 cut therefrom.

It will be noted on referring to Fig. 82 that by moving a block 53 laterally after each splint-cutting operation the splints, if placed back in the block from which they were cut, would lie in a staggered position relatively to each other, thereby reducing the waste of material to a minimum.

It will be apparent that in many figures of the drawings I have omitted various parts for the sake of clearness of illustration and that other and analogous mechanisms may be employed to carry out the broad principles of this invention without departing from the spirit thereof, and I do not, therefore, desire to be limited in every instance to the exact constructions I have herein shown and described.

Having thus described my invention, what I claim as new, and desire to secure by Letters Patent, is—

1. In a match-making machine, means for cutting splints, a beveled inclined conveyer in which said splints are received, and means for retaining said splints in said conveyer, while the cutting device is being removed from said splints.

2. In a match-making machine, means for cutting splints, a beveled inclined rotary conveyer in which said splints are received, and means for retaining said splints in said conveyer while the cutting device is being removed from said splints.

3. In a match-making machine, means for cutting splints, a rotary beveled inclined conveyer in which said splints are received in one plane and carried to a plane at an angle thereto, and means for retaining said splints in said conveyer while the cutting device is being removed from said splints.

4. In a match-making machine, means for cutting splints, a beveled inclined conveyer in which said splints are received, and means for retaining said splints in said conveyer while the cutting device is being removed from said splints, in combination with means for imparting an intermittent movement to said conveyer.

5. In a match-making machine, means for cutting splints, a beveled inclined conveyer, means for securing said splints in said conveyer, means for heating and drying said splints, and means for applying the composition to the ends of said splints to form the match-heads.

6. In a match-making machine, means for cutting splints, a beveled inclined rotary conveyer, means for securing said splints in said conveyer, means for heating and drying said splints, means for waxing said splints and means for applying the composition to the ends of said splints to form the match-heads.

7. In a match-making machine, means for cutting splints, a beveled, inclined, rotary conveyer, means for securing said splints in said conveyer, means for heating and drying said splints, and means for applying the composition to the ends of said splints to form the match-heads, in combination with means for directing a blast upon said heads so as to cause the latter to become set.

8. In a match-making machine, means for cutting splints, a beveled inclined rotary conveyer, means for securing said splints in said conveyer, means for heating and drying said splints, and means for applying the composition to the ends of said splints to form the match-heads, in combination with movable means for ejecting the finished matches from said conveyer.

9. In a match-making machine, means for cutting splints, a rotary beveled inclined conveyer, means for securing said splints in said conveyer, means for heating and drying said splints, and means for applying the composition to the ends of said splints to form the match-heads, in combination with movable means for loosening the finished matches from said conveyer, and movable means for ejecting said matches therefrom.

10. In a match-making machine, means for cutting splints, a rotary beveled inclined conveyer, means for securing said splints in said conveyer, means for heating and drying said splints, and means for applying the composition to the ends of said splints to form the match-heads, in combination with means for loosening the finished matches from said conveyer and means for ejecting said matches therefrom upon drying devices.

11. In a match-making machine, an inclined conveyer, a beveled surface on said conveyer, grooves in said surface, means for feeding match-splints into said grooves, and means for pressing the same thereinto.

12. In a match-making machine, a cutter for cutting match-splints, a conveyer located in proximity to said cutter, means for intermittently actuating said conveyer, grooves of different angularity carried by said conveyer, fingers located above said grooves and adapted to press said splints thereinto and means for actuating said fingers to and away from said conveyer, whereby the splints are pressed into the grooves and the conveyer can rotate after the fingers are moved away.

13. In a match-making machine, a cutter for cutting match-splints, a conveyer located in proximity to said cutter, means for intermittently actuating said conveyer, grooves of different angularity carried by said conveyer, fingers located above said grooves adapted to press said splints thereinto and means for actuating said fingers to and away from said conveyer whereby the splints are pressed into the grooves and the conveyer can rotate after the fingers are moved away, in combination with means for drying, waxing and applying composition to said splints.

14. In a match-making machine, a cutter for cutting match-splints, an inclined circular conveyer having grooved plates attached thereto, whereby the matches are received horizontally and dipped vertically, means for securing said splints in the grooves in said plates, and means for holding the splints therein in a plane inclined to the plane of rotation of the said conveyer.

15. In a match-making machine, a cutter for cutting match-splints, an inclined circular conveyer having grooved plates attached thereto, whereby the matches are received horizontally and dipped vertically, means for pressing said splints in the grooves in said plates, and means for holding the splints in a plane inclined to the plane of rotation of said conveyer, in combination with means for applying the composition to the ends of said splints so as to form the match-heads.

16. In a match-making machine, a cutter for cutting match-splints, a beveled inclined conveyer whereby the matches are received in a horizontal plane and moved to a plane at an angle thereto having a curved contour and grooved plates attached thereto, means for pressing said splints in the grooves of said plates, a plate having a concave face movably supported adjacent to said conveyer, whereby the ends of the splints conform to a radius, the center of which is the center of the conveyer, and means for moving said face against the ends of said splints at the proper intervals.

17. In a match-making machine, a cutter for cutting match-splints, a beveled inclined conveyer having a curved contour and grooved plates attached thereto, means for pressing said splints in the grooves of said plates, a plate having a concave face movably supported adjacent to said conveyer, whereby the ends of the splints conform to a radius, the center of which is the center of the conveyer, and means for moving said face against the ends of said splints at the proper intervals, in combination with means for treating the ends of said splints so as to produce the finished matches.

18. In a match-making machine, an inclined spider, a beveled circular conveyer rotatably mounted thereon, whereby the splints are received horizontally and dipped vertically, and means for intermittently actuating said conveyer.

19. In a match-making machine, a reciprocating cutting device, a spider located in proximity thereto, a beveled rotary inclined conveyer mounted on said spider, and means for intermittently actuating said conveyer.

20. In a match-making machine, a reciprocating cutting device, a spider located in proximity thereto, a beveled rotary inclined conveyer mounted on said spider, and means for intermittently actuating said conveyer, in combination with means for retaining matchsplints in said conveyer, and means for drying, waxing and coating said splints.

21. In a match-making machine a beveled inclined conveyer having a curved contour, means for intermittently actuating the latter, devices located in proximity to said conveyer for drying, waxing, coating and hardening a match-head, and a movable ejecting device for propelling the finished match from said conveyer.

22. In a match-making machine, a conveyer for supporting the finished matches, an ejector for propelling said matches from said conveyer, means for imparting a slow rotary movement to said ejector during its contact with said matches, and means for imparting an accelerated rotary movement to said ejector after the latter leaves said matches.

23. In a match-making machine, the combination of a conveyer, devices for holding matches thereon, a plate for loosening said matches, and a rotary ejector for finally discharging said matches from said conveyer.

24. In a match-making machine, the combination of a conveyer, devices for holding matches thereon, a plate for loosening said matches, and a rotary ejector for finally discharging said matches from said conveyer, said ejector moving slowly against said matches, but having an accelerated movement after it leaves said matches.

25. In a match-making machine, an inclined conveyer, adapted to receive the matches horizontally and move the same to a plane at an angle thereto, devices for holding matches thereon, means for loosening said matches, and a rotary ejector having teeth adapted to enter said devices longitudinally for finally discharging said matches from said conveyer.

26. In a match-making machine, an inclined conveyer, devices for holding matches thereon, means for loosening said matches, and a rotary ejector for finally discharging said matches, in combination with means for moving said ejector slowly against said matches, and means for giving said ejector accelerated movement after leaving said matches.

27. In a match-making machine, a beveled inclined circular conveyer, means for actuating the latter, and means for holding a match on said conveyer in a horizontal position and moving the same to a vertical position, for the dipping of said match, whereby a perfect head is formed in the splint.

28. In a match-making machine, a roller for applying the composition to the ends of the splints, means for rotating the same when in the composition, means for holding the splints and for carrying the same to said roller, the plane of movement of the said splints being at an angle to the plane of rotation of said roller and means for elevating and stopping the rotation of said roller when said composition is applied to the ends of said splints, whereby only the ends of the splints are supplied with composition and a surplus supply thereof is prevented.

29. In a match-making machine, a roller for applying the composition to the ends of the splints, means for holding said splints in a vertical position when the composition is applied thereto, and means for elevating said roller when said composition is applied to the ends of said splints, in combination with means for stopping the rotation of said roller when in its elevated position, and devices for effecting the rotation of said roller when in its lowermost position.

30. In a match-making machine, a receptacle for the composition, a hot-water jacket surrounding said composition, a roller adapted to revolve in said composition, means for raising and lowering said roller and means for stopping the rotation of said roller when the latter is in its elevated position.

31. In a match-making machine, the combination of a receptacle for the composition, a stirrer rotatably mounted in the lower portion of said receptacle, a roller rotatably mounted in the upper portion of said receptacle, means for causing said stirrer to continuously rotate and mechanism for causing said roller to intermittently rotate, whereby the same will be stationary when in contact with the splint, so that an excess of material cannot be imparted to the splint.

32. In a match-making machine, a circular conveyer, supported at an angle, means for imparting an intermittent rotary movement to said conveyer, a beveled surface on the latter, and devices on said surface for engaging match-splints, said surfaces being so arranged that said splints will be fed thereto in a horizontal position and will stand in a vertical position during the act of dipping.

33. In a match-making machine, means for cutting splints, a beveled inclined conveyer adapted to receive the splints in a plane inclined to the plane of rotation thereof, means for dipping the same, a chain adapted to receive the finished match and drying-aprons adapted to receive the match from said chains.

34. In a match-making machine, a cutter for cutting match-splints, a conveyer located in proximity to said cutter, means for actuating said conveyer, grooves carried by said conveyer, fingers located above said grooves in the path of the conveyer adapted to press said splints thereinto, means for actuating said fingers to and away from said splints, and grooves or serrations on said fingers.

35. In a match-making machine, the combination of a conveyer, devices for holding the matches thereon, a plate for loosening the said matches, and grooves or corrugations therein corresponding to said devices.

36. In a match-making machine, the combination of a conveyer, devices for holding the matches thereon, an ejector for discharging said matches from said conveyer, and a plate or guard on said ejector extending over the matches, whereby the same are prevented from being scattered.

37. In a match-making machine, the combination of a conveyer, devices for holding the matches thereon, a plate for loosening said matches, an ejector for finally discharging said matches from said conveyer, and a guard on said conveyer.

38. In a match-making machine, the combination of a conveyer, devices for holding the matches thereon, an ejector for finally discharging said matches from said conveyer, and a groove in the lower portion of said ejector adapted to prevent the matches from falling down.

39. In a match-making machine, a conveyer consisting of a circular frame rotatably supported at an angle, said frame having a beveled surface and adapted to receive match-splints so that the splints in one portion will be in a horizontal position and the splints in another portion will be in a vertical position for dipping the same.

40. In a match-making machine, a beveled inclined conveyer receiving the splints in one plane and carrying the same to a plane at an angle thereto.

41. In a match-making machine, a beveled inclined conveyer receiving the splints in one plane and dipping the same in a plane substantially at right angles thereto.

42. In a match-making machine, a beveled rotary inclined conveyer adapted to receive the splints in one part of the machine in one plane and to carry the same to another part of the machine in a different plane.

43. In a match-making machine, a cutting device, a dipping device, and a beveled inclined conveyer adapted to receive the splint substantially horizontally from the cutting device and carry the same to substantially an upright position to the dipping device.

44. In a match-making machine, a beveled inclined conveyer adapted to receive the splint in one plane and means for rotating said conveyer, whereby the splint is carried to a plane at an angle to the first-mentioned plane.

45. In a match-making machine a beveled inclined conveyer adapted to receive the splints in a plane inclined to the plane of rotation of said conveyer and means for waxing and dipping the match-splints.

46. In a match-making machine, a beveled inclined conveyer adapted to receive the splints in a plane inclined to the plane of rotation of the said conveyer and adapted to carry said splints to a plane substantially at right angles to the receiving plane.

47. In a match-making machine, a beveled inclined conveyer, means for feeding match-splints thereto, means for securing said splints to said conveyer, means for heating and drying said splints and means for applying a composition to the ends of said splints to form the match-heads.

48. In a match-making machine, a beveled inclined conveyer adapted to receive the splints from the feeding device in one plane and carry the same to another plane at an angle thereto, and means for securing said splints in said conveyer.

49. In a match-making machine, a rotary beveled inclined conveyer, means for feeding the splints to said conveyer, means for securing said splints in said conveyer and means for ejecting said splints from said conveyer after the composition has been applied thereto.

50. In a match-making machine, an inclined conveyer, a beveled surface thereon, grooves in said surface, which are situated at an angle to each other, and means for feeding match-splints into said grooves and for pressing the same thereinto.

51. In a match-making machine in combination with the splint delivering and dipping device, of a carrier interposed between the same, said carrier having a beveled face to receive the splints from the delivering device in one plane inclined to the plane of rotation of said carrier and present them in another plane to the dipping device.

52. In a match-making machine, an inclined conveyer having a beveled surface on the periphery thereof, which is adapted to receive the match-splints in a plane inclined to the plane of rotation of the said conveyer.

53. In a match-making machine, an inclined conveyer and means thereon which are adapted to receive the splints in a plane inclined to the plane of rotation of said conveyer and carry the said splints to a plane at an angle thereto.

54. In a match-making machine, a conveyer, grooves on the periphery thereof adapted to receive and hold the match-splints, and an ejecting device having teeth thereon, which latter are adapted to enter the grooves longitudinally in said conveyer for removing the splints.

55. In a match-making machine, a roller for applying the composition to the splints, means for rotating the same, a conveyer adapted to receive the splints and carry the same to the dipping-roller, the plane of rotation of said roller being at an angle to the plane of movement of the conveyer and means for stopping the rotation of said roller when the composition is applied to the splints.

56. In a match-making machine, a roller for applying composition to the splints, means for rotating the same, a conveyer adapted to receive the splints, means for moving the conveyer which movement is in a plane at an angle to the plane of rotation of said roller and means for stopping the rotation of the roller and the movement of the conveyer simultaneously during the dipping.

57. In a match-making machine, a roller for applying the composition to the ends of the splints, means for rotating the roller when in the composition, a conveyer for receiving the splints and carrying the same to the roller, the plane of movement of said conveyer being at an angle to the plane of rotation of said roller and means for elevating said roller whereby the same is prevented from rotating at the dipping of the splints.

58. In a match-making machine, a dipping device adapted to rotate, means for elevating said dipping device and means for carrying the splints to said device, the plane of movement of said carrying means being at an angle to the plane of rotation of said dipping device.

FRANK SCHAFER.

Witnesses:
E. HAYWARD FAIRBANKS,
C. D. McVAY.